(12) United States Patent
Danziger et al.

(10) Patent No.: US 11,902,714 B1
(45) Date of Patent: Feb. 13, 2024

(54) IMAGE PROJECTOR WITH LASER SCANNING OVER SPATIAL LIGHT MODULATOR

(71) Applicant: Lumus Ltd., Ness Ziona (IL)

(72) Inventors: Yochay Danziger, Kfar Vradim (IL); Daniel Michaels, Ramat Gan (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 18/036,917

(22) PCT Filed: Dec. 20, 2021

(86) PCT No.: PCT/IL2021/051510
§ 371 (c)(1),
(2) Date: May 15, 2023

(87) PCT Pub. No.: WO2022/130393
PCT Pub. Date: Jun. 23, 2022

Related U.S. Application Data

(60) Provisional application No. 63/236,700, filed on Aug. 25, 2021, provisional application No. 63/163,964, filed on Mar. 22, 2021, provisional application No. 63/141,992, filed on Jan. 27, 2021, provisional application No. 63/141,120, filed on Jan. 25, 2021, provisional application No. 63/138,559, filed on Jan. 18, 2021, provisional application No. 63/136,701, (Continued)

(51) Int. Cl.
*H04N 9/31* (2006.01)
(52) U.S. Cl.
CPC .......... *H04N 9/3135* (2013.01); *H04N 9/312* (2013.01)
(58) Field of Classification Search
CPC .... H04N 9/3135; H04N 9/312; H04N 9/3152; H04N 9/3161; H04N 9/3197; H04N 9/31; H04N 9/3108; G02B 27/104; G02B 27/1033; G02B 27/1053
USPC .......... 348/744, 757, 759, 750, 780
See application file for complete search history.

(56) References Cited

U.S. PATENT DOCUMENTS

| 4,383,740 A | 5/1983 | Bordovsky |
| 5,404,542 A | 4/1995 | Cheung |

(Continued)

FOREIGN PATENT DOCUMENTS

| JP | 2004066543 A | 8/2002 |
| JP | 2005005817 | 2/2008 |

(Continued)

OTHER PUBLICATIONS

International Commission on Non-Ionizing Radiation Protection "ICNIRP Guidelines for Limiting Exposure To Time-Varying Electric, Magnetic and Electromagnetic Fields (Up To 300 GHZ)" Published In: Health Physics 74 (4):494-522; 1998.

(Continued)

*Primary Examiner* — Sherrie Hsia
(74) *Attorney, Agent, or Firm* — Mark M. Friedman

(57) ABSTRACT

An image projector employing a laser scanning illumination arrangement to illumination a spatial light modulator (SLM), where an angular beam spreader element, typically a diffuser or a micro-lens array (MLA), adjacent to, or in a conjugate plane with, the SLM, enhances filling of the exit aperture while minimizing impact on the precision of scanning of the laser illumination on the SLM. Also disclosed are various schemes for synchronous rolling update of the SLM during scanned illumination, and systems employing binary-switchable SLMs.

21 Claims, 20 Drawing Sheets

Related U.S. Application Data filed on Jan. 13, 2021, provisional application No. 63/128,106, filed on Dec. 20, 2020.

(56) References Cited

U.S. PATENT DOCUMENTS

| | | |
|---|---|---|
| 5,608,742 A | 3/1997 | Alan |
| 5,666,226 A | 9/1997 | Ezra et al. |
| 6,101,206 A | 8/2000 | Apollonov et al. |
| 6,580,247 B2 | 6/2003 | Nakazawa |
| 7,142,727 B2 | 11/2006 | Notovits et al. |
| 7,206,479 B2 | 4/2007 | Wu |
| 7,245,643 B2 | 7/2007 | Nakae et al. |
| 7,872,217 B2 | 1/2011 | Kasahara |
| 8,462,087 B2 | 6/2013 | Lee et al. |
| 8,488,245 B1 | 7/2013 | Chann et al. |
| 8,665,178 B1 | 3/2014 | Wang |
| 8,724,222 B2 | 5/2014 | Chann |
| 10,177,872 B1 | 1/2019 | Wang et al. |
| 10,196,209 B2 | 2/2019 | Lindbo et al. |
| 10,302,957 B2 | 5/2019 | Sissom |
| 11,271,362 B2 | 3/2022 | Chen et al. |
| 2002/0017615 A1 | 11/2002 | Matsushita et al. |
| 2002/0176153 A1 | 11/2002 | Matsushita et al. |
| 2003/0004336 A1 | 1/2003 | Siviero |
| 2003/0053507 A1 | 3/2003 | Islam et al. |
| 2003/0142276 A1 | 7/2003 | English et al. |
| 2004/0016525 A1 | 1/2004 | Gervais |
| 2004/0130681 A1 | 7/2004 | Aastuen et al. |
| 2004/0165254 A1 | 8/2004 | Tokura |
| 2004/0213305 A1 | 10/2004 | Nakae et al. |
| 2005/0111072 A1 | 5/2005 | Miyagaki et al. |
| 2005/0151939 A1 | 7/2005 | English et al. |
| 2008/0001901 A1 | 1/2008 | Lee |
| 2008/0019010 A1 | 1/2008 | Govorkov et al. |
| 2008/0101429 A1 | 5/2008 | Sipes |
| 2008/0122839 A1 | 5/2008 | Berglund et al. |
| 2008/0204842 A1 | 8/2008 | Arai et al. |
| 2008/0259429 A1 | 10/2008 | Kamm et al. |
| 2009/0060365 A1 | 3/2009 | Nagata et al. |
| 2009/0219960 A1 | 9/2009 | Uberna et al. |
| 2010/0002029 A1 | 1/2010 | Takatsuka |
| 2010/0020291 A1 | 1/2010 | Kasazumi et al. |
| 2010/0080000 A1 | 4/2010 | Inoue et al. |
| 2010/0110368 A1 | 5/2010 | Chaum |
| 2012/0003907 A1 | 1/2012 | Carlson et al. |
| 2012/0038693 A1 | 2/2012 | Kang et al. |
| 2012/0039072 A1 | 2/2012 | Lell et al. |
| 2013/0010265 A1 | 1/2013 | Curtis |
| 2013/0027232 A1 | 1/2013 | Liu et al. |
| 2013/0050391 A1 | 2/2013 | Maeda |
| 2014/0003762 A1 | 1/2014 | Macnamara |
| 2014/0004961 A1 | 1/2014 | Brunet De Courssou |
| 2014/0009508 A1 | 1/2014 | Woodgate et al. |
| 2016/0109712 A1 | 4/2016 | Harrison et al. |
| 2016/0161740 A1 | 6/2016 | Bar-Zeev et al. |
| 2016/0189432 A1 | 6/2016 | Bar-Zeev et al. |
| 2016/0209648 A1 | 7/2016 | Haddick et al. |
| 2016/0266387 A1 | 9/2016 | TeKolste |
| 2017/0017095 A1 | 1/2017 | Fricker et al. |
| 2017/0125976 A1 | 5/2017 | Sato |
| 2017/0132757 A1 | 5/2017 | Thiebaud et al. |
| 2018/0009733 A1 | 1/2018 | Black |
| 2018/0067289 A1 | 3/2018 | Takahashi |
| 2018/0097335 A1 | 4/2018 | Breidenassel et al. |
| 2018/0267295 A1 | 9/2018 | Dalrymple et al. |
| 2018/0341223 A1 | 11/2018 | Shestak et al. |
| 2019/0005660 A1 | 1/2019 | Kinoshita |
| 2019/0012113 A1 | 1/2019 | Spencer |
| 2019/0121137 A1 | 4/2019 | Dykaar |
| 2019/0129175 A1 | 5/2019 | Amitai |
| 2019/0334321 A1 | 10/2019 | Argua |
| 2020/0034368 A1 | 1/2020 | Santos et al. |
| 2020/0292818 A1 | 9/2020 | Amitai et al. |
| 2021/0072553 A1 | 3/2021 | Danziger et al. |
| 2022/0014958 A1 | 1/2022 | Mirfakhraei et al. |
| 2022/0123527 A1 | 4/2022 | Danziger |
| 2022/0190562 A1 | 6/2022 | Danziger et al. |
| 2022/0310890 A1 | 9/2022 | Hansen et al. |
| 2022/0360039 A1 | 11/2022 | Russell et al. |

FOREIGN PATENT DOCUMENTS

| | | |
|---|---|---|
| JP | 2017135605 A | 8/2017 |
| JP | 2019160624 | 9/2019 |
| WO | 2009091610 | 7/2009 |
| WO | 2019111237 | 6/2019 |
| WO | 2019/149352 | 8/2019 |

OTHER PUBLICATIONS

Jan van de Kraats et al. "Directional and nondirectional spectral reflection from the human fovea" journal of biomedical optics 13(2), 024010 Mar./ Apr. 2008.

Petros L. Stavroulakis et al : "Suppression iof backsacattered diffraction from sub-wavelength 'moth-eye arrays'"; published in Optics Express Jan. 2013.

Jan Van De Kraats; et al "Directional and Non-Directional Spectral reflection from the Human Fovea"; Journal of Biomedial Optics vol. (13)/2.

International Commission on Non-Ionizing Iradiation Protection : "NCIRP Guidelines for limiting Exposure to Time-Varying Electric, Magnetic and Electromagnetic Fields"; Published in Health Physics , Apr. 1998 vol. 74 No. 4.

R.J Wiblein et al ;"Optimized Anti-Reflective structures for $As\_2s\_3$ Chalcogenide Optical Fibers", published in Optics Express , May 2, 2016 vol. 24 No. 9.

O.Yang et al; "Antireflection Effects at NanoStructures Materials Interfaces and teh Suppression of Thin-Film Intereference"; published in Nanotechnology 24 (2013).

Mukawa et al; "A full-color eyewear display using planar waveguides with reflection volume holograms" Journal of the SID 17/3,200.

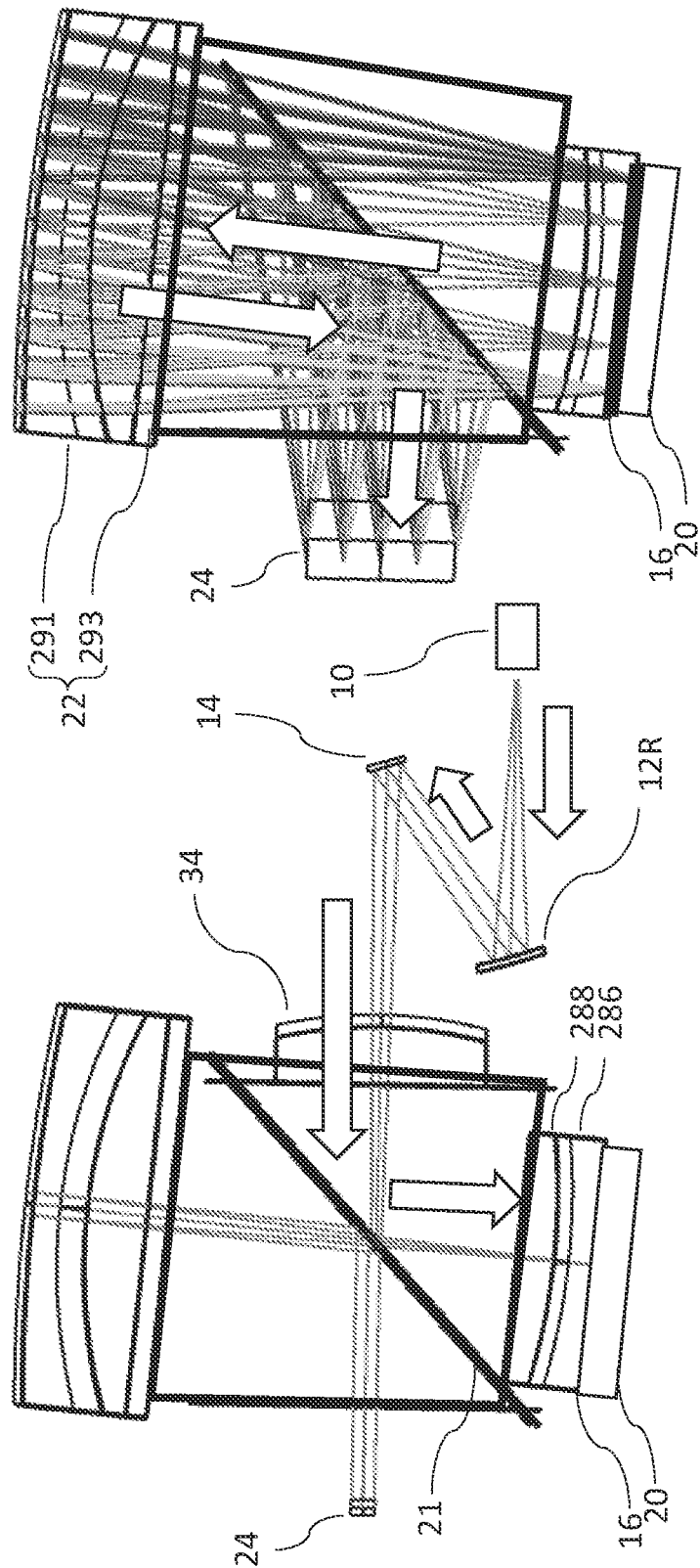

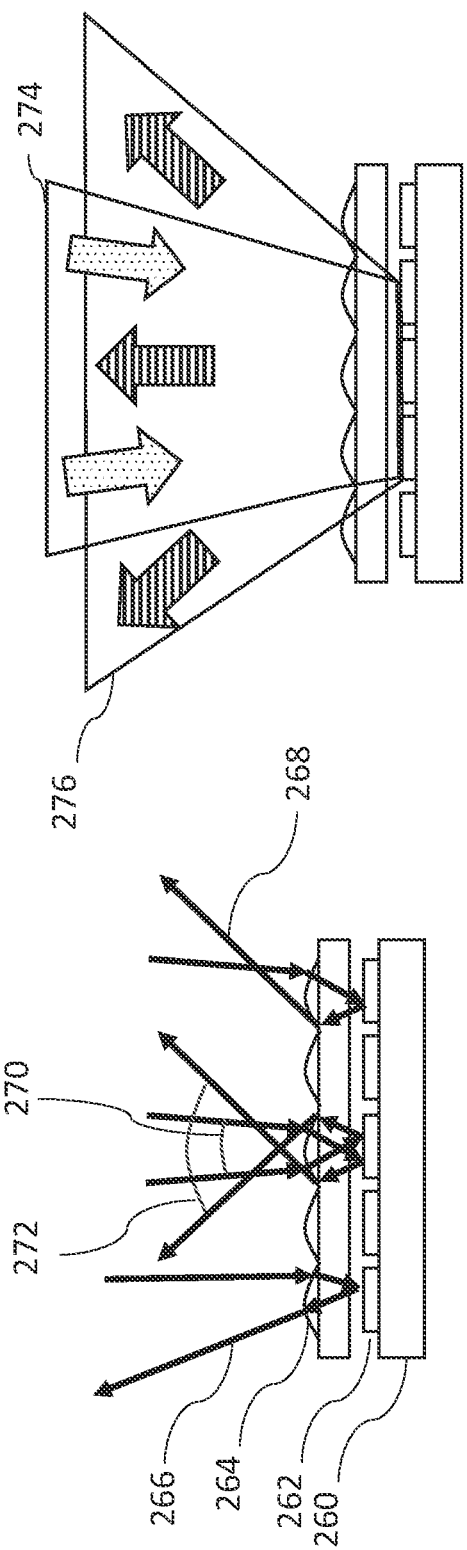

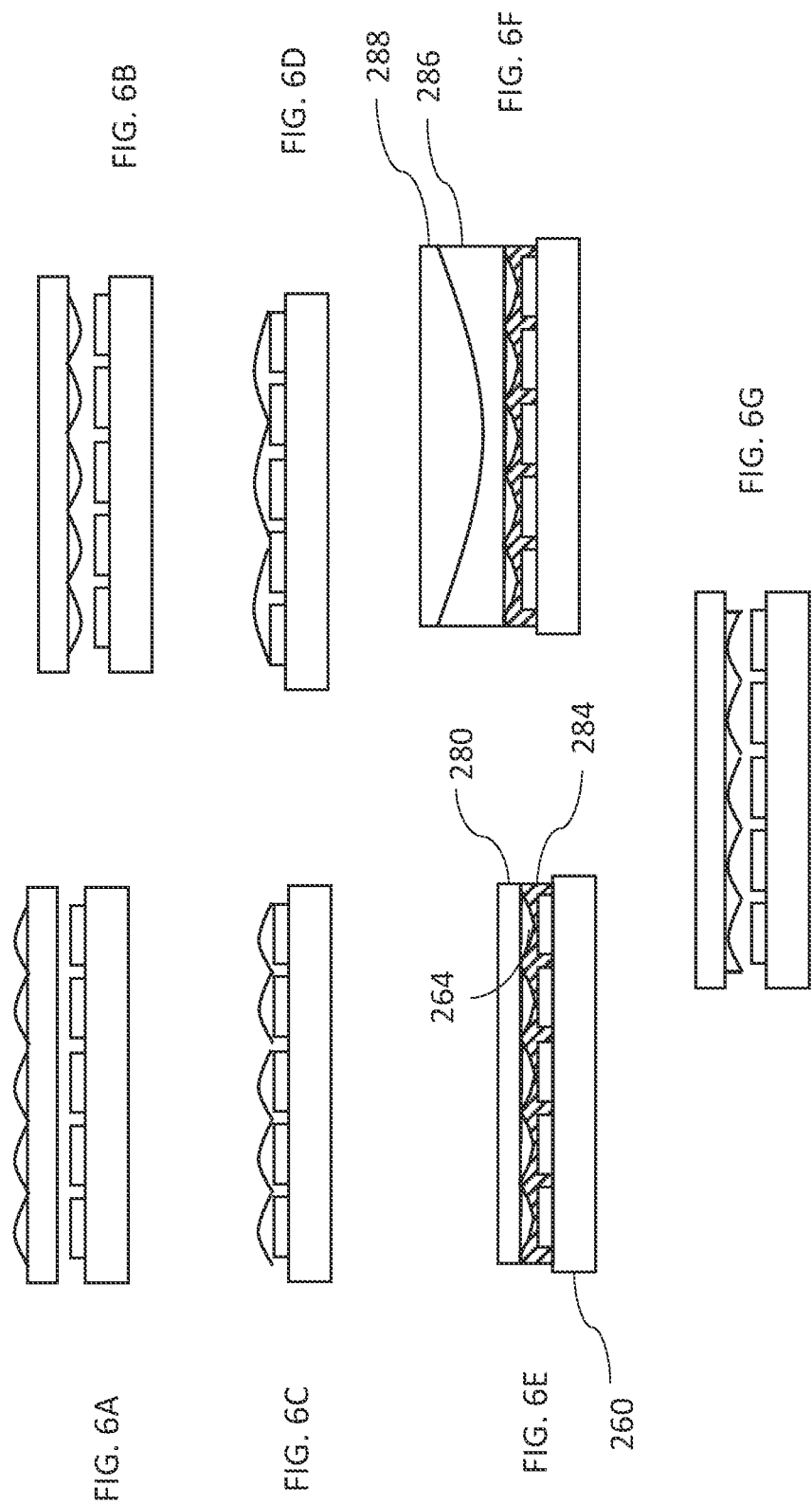

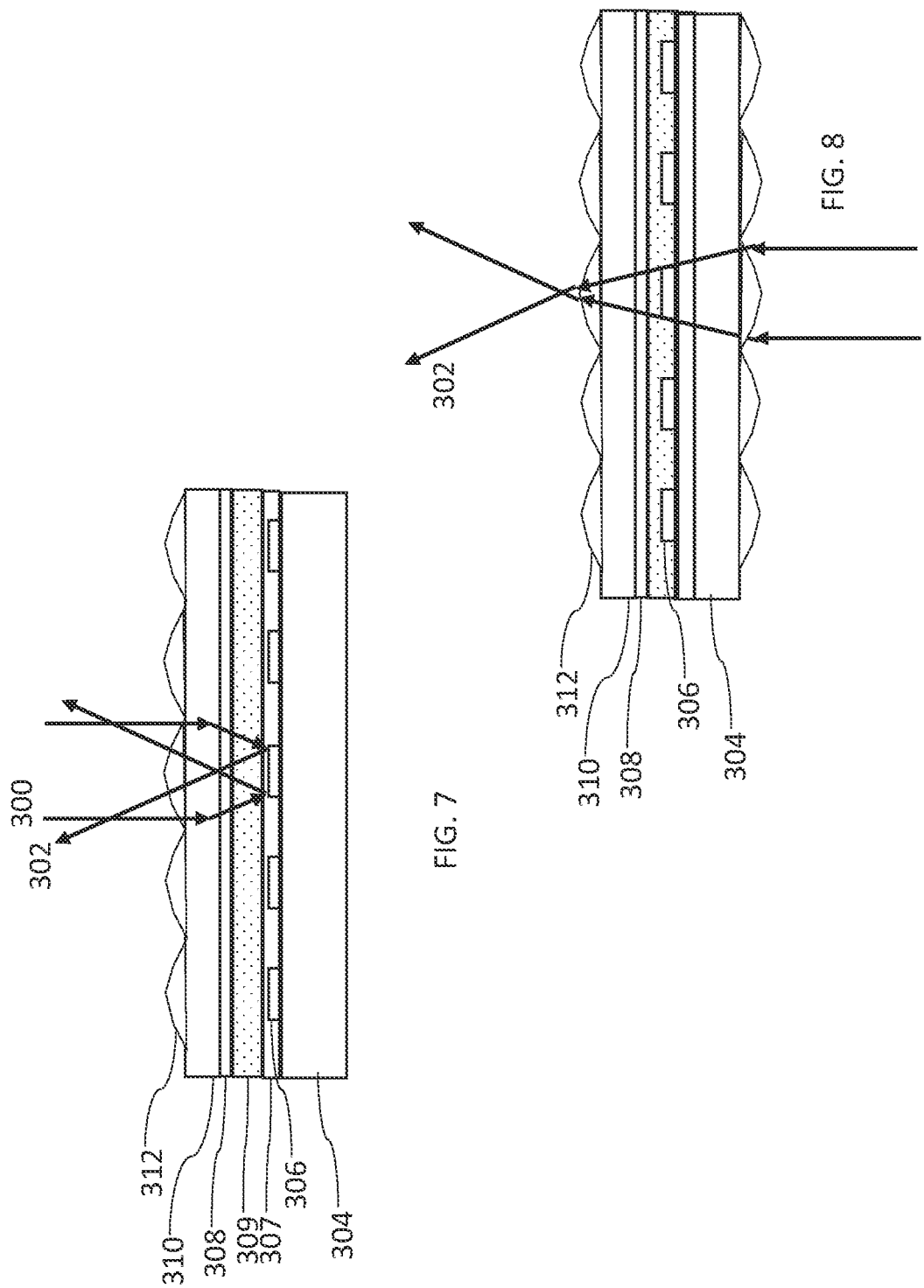

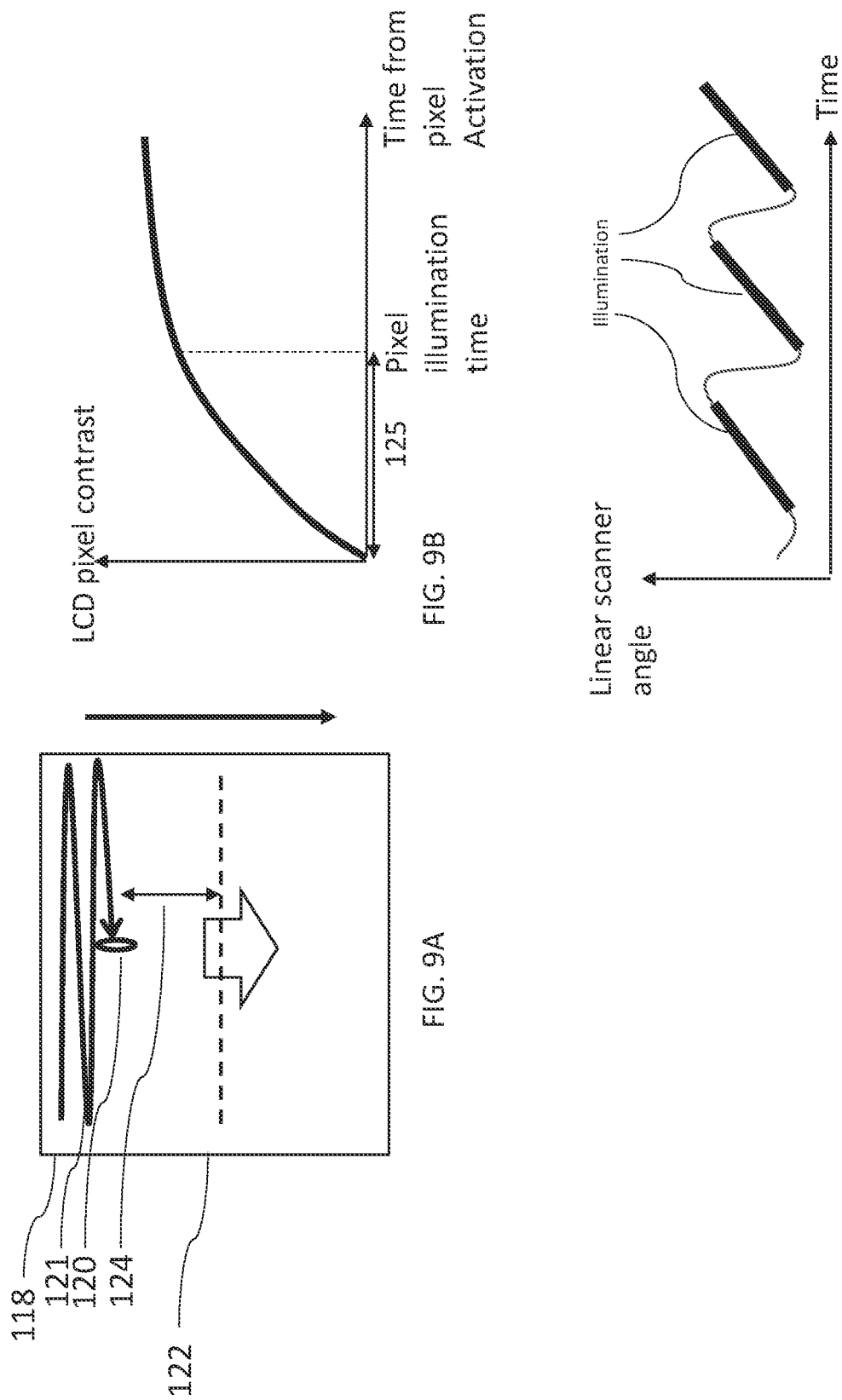

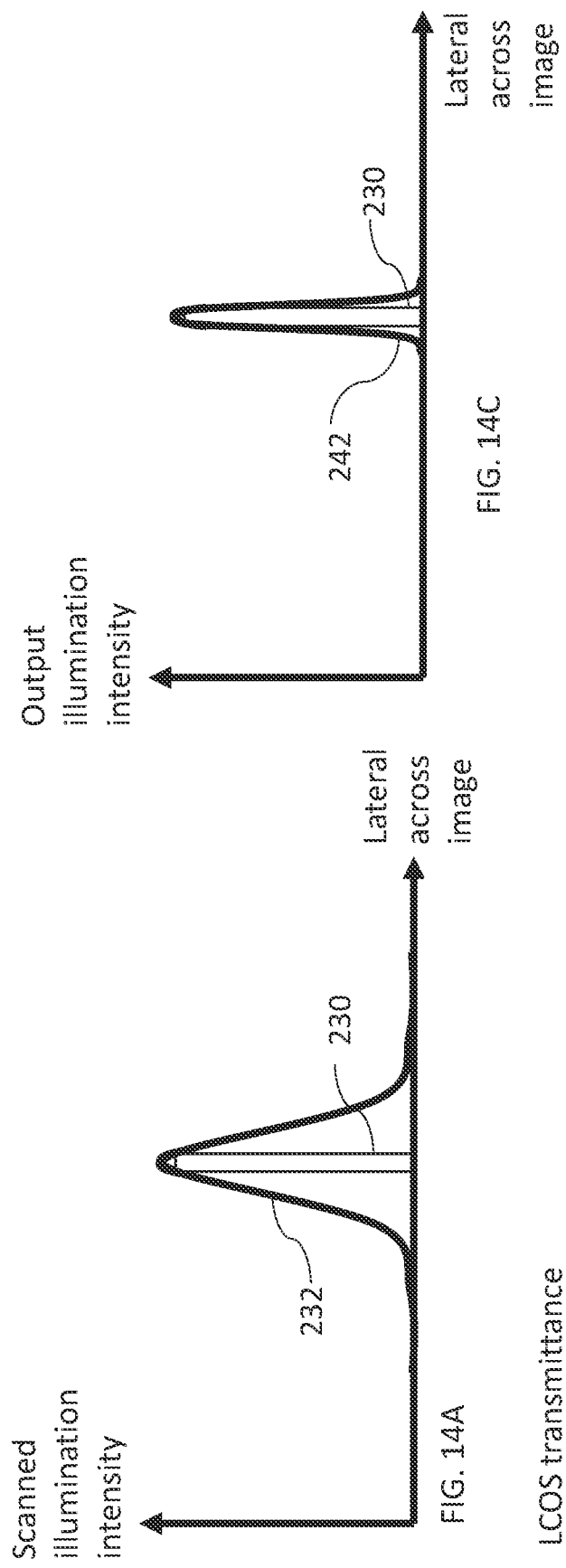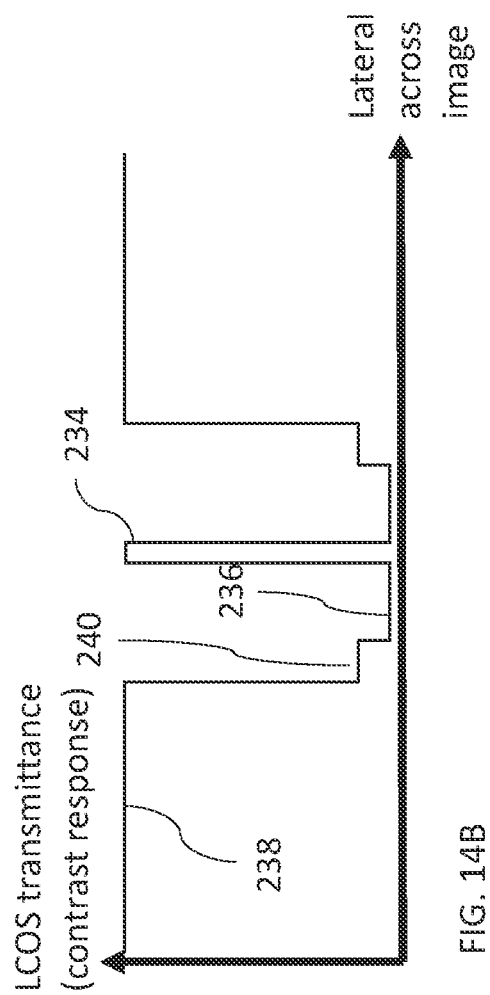

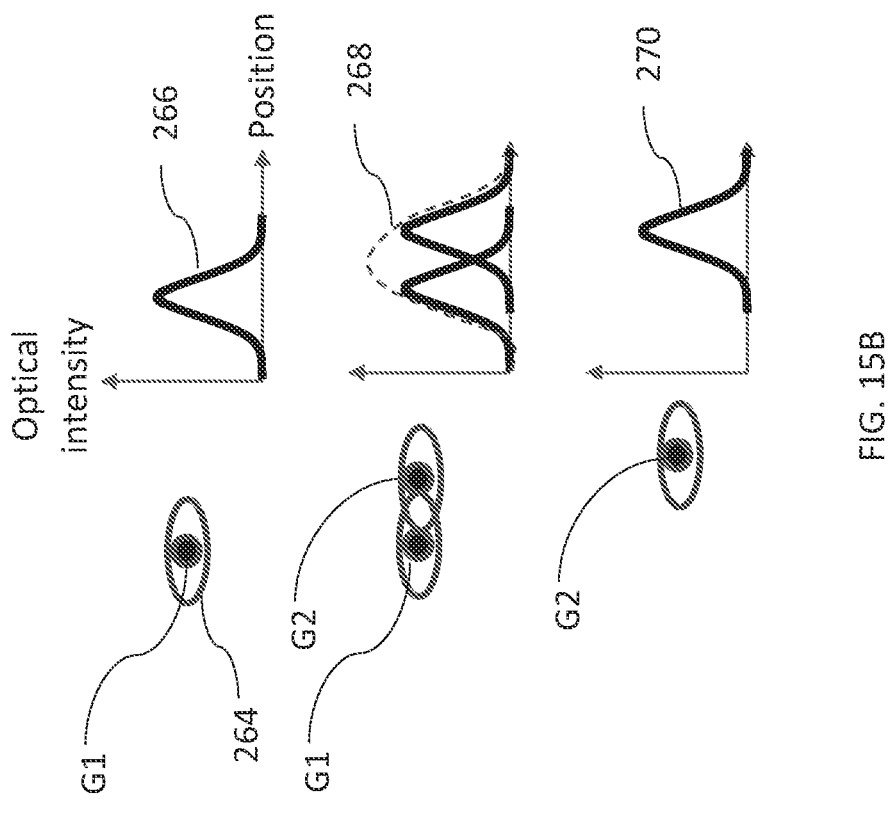
FIG. 15A
FIG. 15B
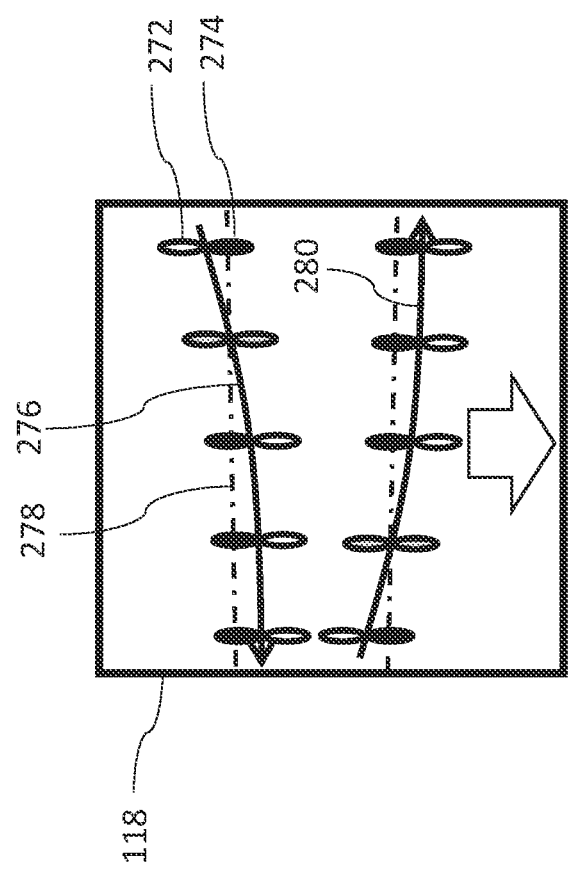
FIG. 15C

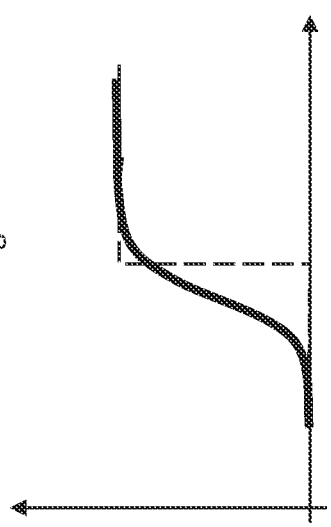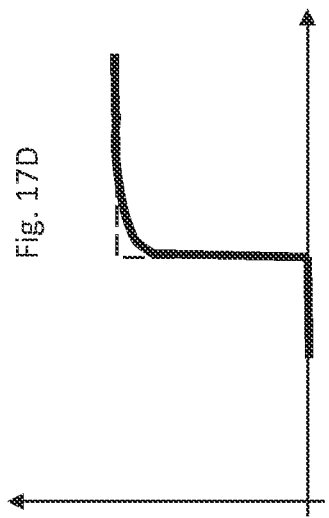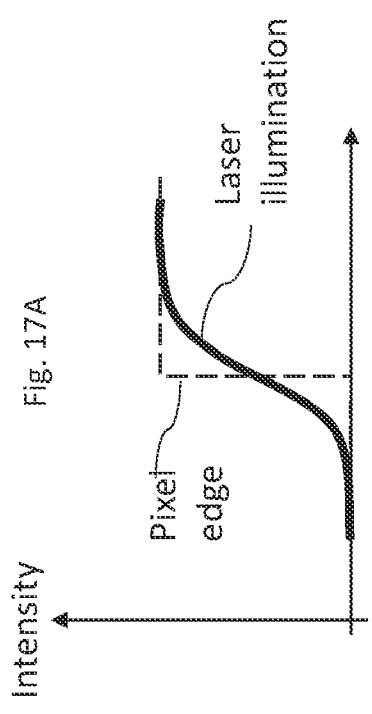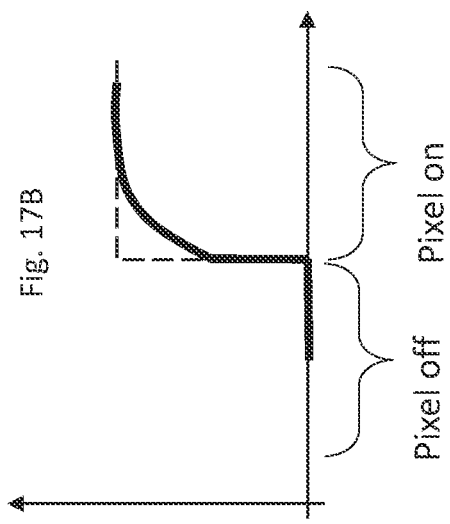

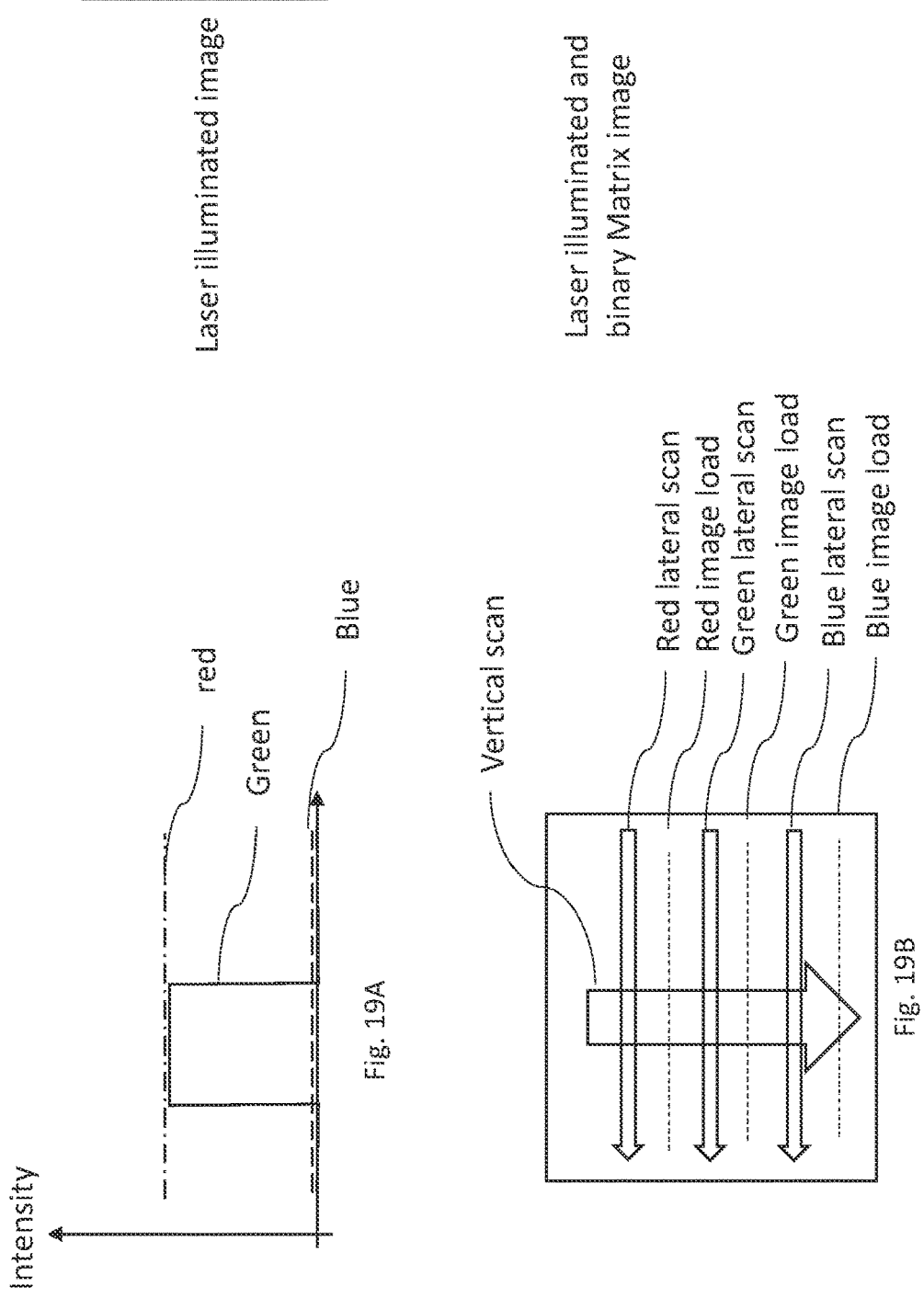

IMAGE PROJECTOR WITH LASER SCANNING OVER SPATIAL LIGHT MODULATOR

FIELD AND BACKGROUND OF THE INVENTION

The present invention relates to image projectors and, in particular, it concerns image projectors with various configurations for illuminating a spatial light modulator.

It is known to project an image by illuminating a spatial light modulator (SLM), such as a liquid crystal display (LCD), a digital light processing (DLP) chip or a liquid crystal on silicon (LCOS) modulator, and projecting the image for viewing by a user. Such projectors are often used in near eye displays, where the projected image is typically collimated and introduced into a light guide along which the image propagates by internal reflection until being coupled out to the eye of the user, typically by partially-reflective surfaces or by diffractive elements, which may contribute to expansion of the effective optical aperture from which the image is projected towards the eye.

Prior publication WO 2019/111237 A1 discloses a projector in which illumination of the SLM is performed sequentially by switching or scanning an illumination source across an LCOS modulator. FIGS. 9A and 12B of the aforementioned publication are reproduced here as FIGS. 1A and 1B, and the original reference numerals are referred to here in parentheses. Lasers (10) transmit light that is focused by lens (12). The converging beam is reflected by scanning mirror (14) onto polarizing beam splitter (PBS1). Reflecting lens (R1) further focuses the beam via a second polarizing beam splitter (PBS2) so as to be focused on LCOS (20). The reflected beam is reflected by a third polarizing beam splitter (PBS3) onto collimating reflecting lens (22). The collimated beams then exit aperture (24) that is also the entrance aperture into a waveguide. The aforementioned reference also discloses that the activation of the LCOS can be in synchronization with a linear scan of a line of illumination (FIG. 1B).

SUMMARY OF THE INVENTION

The present invention is an image projector.

According to the teachings of an embodiment of the present invention there is provided, an image projector for projecting an image via an exit stop, the image being a representation of an input digital image, the image projector comprising: (a) a spatial light modulator (SLM) providing a two-dimensional array of pixel elements defining an SLM resolution, each of the pixel elements being controllable to modulate a property of light transmitted or reflected by the pixel element; (b) a scanning illumination arrangement deployed to scan a beam of illumination across the two-dimensional array of the spatial light modulator in a two-dimensional scanning pattern while synchronously modulating an intensity of the beam of illumination; (c) a controller in electronic connection with the spatial light modulator and the scanning illumination arrangement; and (d) projecting optics comprising at least one optical element configured to project illumination from the spatial light modulator to generate an output image directed to the exit stop, wherein the controller is configured to: (i) process the input digital image to generate a first modified image, the first modified image corresponding substantially to a reduced resolution version of the input digital image having a resolution less than the SLM resolution in at least one dimension; (ii) process the input digital image to generate a second modified image, the second modified image including pixel modulation data for pixel elements of the SLM corresponding to high spatial frequency variations in the input digital image; (iii) actuate the SLM according to the pixel modulation data of the second modified image; and (iv) drive the scanning illumination arrangement to modulate the intensity of the beam of illumination while scanning across the two-dimensional array so as to illuminate the SLM according to the first modified image, the SLM thereby providing high spatial frequency modulation of the illumination so as to project an output image with pixel intensities corresponding to the digital image.

According to a further feature of an embodiment of the present invention, the two-dimensional scanning pattern has a fast direction aligned with rows of the SLM and a slow direction aligned with columns of the SLM, and wherein the SLM is actuated as a rolling update of pixel rows advancing along the slow direction ahead of the beam of illumination.

According to a further feature of an embodiment of the present invention, the controller is further configured to apply an inverted actuation to the pixel elements of the SLM as a rolling update of pixel rows following behind the beam of illumination.

According to a further feature of an embodiment of the present invention, the SLM is a ferroelectric liquid crystal display in which each pixel element is switchable between a bright state and a dark state.

According to a further feature of an embodiment of the present invention, the controller is configured to apply at least one criterion to determine a sub-region of the SLM required to generate high resolution output in a corresponding sub-field of the output image, the controller being configured to actuate the sub-region of the SLM while leaving a plurality of pixel elements outside the sub-region unactuated.

According to a further feature of an embodiment of the present invention, the pixel elements assume a bright state when not actuated, and wherein the controller is configured to drive the scanning illumination arrangement to modulate the intensity of the beam of illumination while scanning both inside and outside the sub-region of the SLM.

According to a further feature of an embodiment of the present invention, the at least one criterion includes determining a region of the input digital image containing high spatial frequency content.

According to a further feature of an embodiment of the present invention, the at least one criterion includes determining a sub-field of the output image corresponding to a current gaze direction of an eye of a viewer.

According to a further feature of an embodiment of the present invention, the controller is configured to drive the scanning illumination arrangement to illuminate only the sub-region of the SLM.

According to a further feature of an embodiment of the present invention, there is also provided an angular beam spreader deployed adjacent to the SLM.

According to a further feature of an embodiment of the present invention, there is also provided a micro-lens array (MLA) deployed in non-focused proximity to the SLM.

According to a further feature of an embodiment of the present invention, the MLA includes one lens per pixel element of the SLM, each lens being aligned with a corresponding pixel element.

According to a further feature of an embodiment of the present invention, the MLA is attached to a surface of the SLM.

According to a further feature of an embodiment of the present invention, the MLA is integrated with a transparent substrate overlying the SLM.

According to a further feature of an embodiment of the present invention, the MLA is in facing relation to the SLM and wherein the substrate provides a planar surface facing away from the MLA.

According to a further feature of an embodiment of the present invention, the MLA is formed from a material having a first refractive index, and wherein a transparent adhesive fills a space between the MLA and the SLM, the transparent adhesive having a second refractive index different from the first refractive index.

According to a further feature of an embodiment of the present invention, the substrate is part of field lens extending across the SLM.

According to a further feature of an embodiment of the present invention, the field lens is implemented as a doublet lens that presents a planar surface facing away from the SLM.

According to a further feature of an embodiment of the present invention, there is also provided: (a) an intermediate optical arrangement with positive optical power deployed in an optical path between the SLM and the collimating arrangement, the intermediate optical arrangement refocusing illumination from the SLM at an image plane; and (b) an angular beam spreader deployed at the image plane, wherein the projecting optics is deployed to project illumination from the image plane to generate the output image directed to the exit stop.

According to a further feature of an embodiment of the present invention, there is also provided: (a) an angular beam spreader deployed at an illumination image plane, the scanning illumination arrangement being configured to generate a modulated scanned illumination pattern at the illumination image plane; and (b) an intermediate optical arrangement with positive optical power deployed in an optical path between the illumination image plane and the SLM, the intermediate optical arrangement refocusing illumination from the illumination image plane at the SLM.

According to a further feature of an embodiment of the present invention, the angular beam spreader is a micro-lens array.

There is also provided according to the teachings of an embodiment of the present invention, an image projector for projecting an image via an exit stop, the image being a representation of an input digital image, the image projector comprising: (a) a spatial light modulator (SLM) providing a two-dimensional array of pixel elements arranged in rows and columns, each of the pixel elements being controllable to modulate a property of light transmitted or reflected by the pixel element; (b) a scanning illumination arrangement deployed to scan a beam of illumination across the two-dimensional array of the spatial light modulator in a two-dimensional scanning pattern while synchronously modulating an intensity of the beam of illumination, the two-dimensional scanning pattern having a fast direction aligned with the rows and a slow direction aligned with the columns; (c) a controller in electronic connection with the spatial light modulator and the scanning illumination arrangement; and (d) projecting optics comprising at least one optical element configured to project illumination from the spatial light modulator to generate an output image directed to the exit stop, wherein the controller is configured to: (i) actuate the SLM with a rolling update of pixel data to pixel rows advancing along the slow direction of the scanning pattern; (ii) drive the scanning illumination arrangement to illuminate rows of pixels advancing in the slow direction behind the rolling update of pixel data; and (iii) apply an inverted actuation to the pixel elements of the SLM as a rolling update of pixel rows following behind the beam of illumination.

There is also provided according to the teachings of an embodiment of the present invention, an image projector for projecting an image via an exit stop, the image being a representation of an input digital image, the image projector comprising: (a) a spatial light modulator (SLM) providing a two-dimensional array of pixel elements, each of the pixel elements being controllable to modulate a property of light transmitted or reflected by the pixel element; (b) a scanning illumination arrangement deployed to scan a beam of illumination across the two-dimensional array of the spatial light modulator in a two-dimensional scanning pattern while synchronously modulating an intensity of the beam of illumination; (c) a controller in electronic connection with the spatial light modulator and the scanning illumination arrangement; and (d) projecting optics comprising at least one optical element configured to project illumination from the spatial light modulator to generate an output image directed to the exit stop, wherein the controller is configured to: (i) apply at least one criterion to determine a sub-region of the SLM required to generate output in a corresponding sub-field of the output image, the controller being configured to actuate the sub-region of the SLM while leaving a plurality of pixel elements outside the sub-region unactuated; and (ii) drive the scanning illumination arrangement to illuminate at least the sub-region of the SLM so as to project an output image with pixel intensities corresponding to the digital image in at least the corresponding sub-field, the pixel intensities being determined by a state of modulation of the pixel elements and an intensity of illumination from the scanning illumination arrangement falling on the pixel elements.

According to a further feature of an embodiment of the present invention, the pixel elements assume a bright state when not actuated, and wherein the controller is configured to drive the scanning illumination arrangement to modulate the intensity of the beam of illumination while scanning both inside and outside the sub-region of the SLM.

According to a further feature of an embodiment of the present invention, the at least one criterion includes determining a region of the input digital image containing high spatial frequency content.

According to a further feature of an embodiment of the present invention, the at least one criterion includes determining a sub-field of the output image corresponding to a current gaze direction of an eye of a viewer.

According to a further feature of an embodiment of the present invention, the controller is configured to drive the scanning illumination arrangement to illuminate only the sub-region of the SLM.

There is also provided according to the teachings of an embodiment of the present invention, an image generating assembly for use with scanned directional illumination from a laser light source, the image generating assembly comprising: (a) a spatial light modulator (SLM) providing a two-dimensional array of pixel elements, each of the pixel elements being controllable to modulate a property of light transmitted or reflected by the pixel element; and (b) an angular beam spreader deployed adjacent to the SLM.

According to a further feature of an embodiment of the present invention, the SLM is a reflective spatial light modulator.

According to a further feature of an embodiment of the present invention, the angular beam spreader is a micro-lens array (MLA) deployed in non-focused proximity to the SLM.

According to a further feature of an embodiment of the present invention, the MLA includes one lens per pixel element of the SLM, each lens being aligned with a corresponding pixel element.

According to a further feature of an embodiment of the present invention, the MLA is attached to a surface of the SLM.

According to a further feature of an embodiment of the present invention, the MLA is integrated with a transparent substrate overlying the SLM.

According to a further feature of an embodiment of the present invention, the MLA is in facing relation to the SLM and wherein the substrate provides a planar surface facing away from the MLA.

According to a further feature of an embodiment of the present invention, the MLA is formed from a material having a first refractive index, and wherein a transparent adhesive fills a space between the MLA and the SLM, the transparent adhesive having a second refractive index different from the first refractive index.

According to a further feature of an embodiment of the present invention, the substrate is part of field lens extending across the SLM.

According to a further feature of an embodiment of the present invention, the field lens is implemented as a doublet lens that presents a planar surface facing away from the SLM.

BRIEF DESCRIPTION OF THE DRAWINGS

The invention is herein described, by way of example only, with reference to the accompanying drawings, wherein:

FIG. 4A is a schematic side view of a compact implementation of the arrangement of FIG. 3 employing a polarizing beam splitter prism;

FIG. 4B is a partial view similar to FIG. 4A showing a plurality of light ray paths through the optical system from the SLM onwards;

FIG. 5A is an enlarged schematic side view representing the effects of an angular beam spreader implemented as a micro-lens array (MLA) on ray paths of incident light reflected from a surface of a reflective SLM;

FIG. 5B is a view similar to FIG. 5A showing an overall angular envelope of incident illumination and reflected illumination;

FIGS. 6A-6G are schematic illustrations of alternative implementations of an MLA adjacent to a reflective SLM, where the MLA is, respectively, on the outside of an adjacent substrate, on the inside of an adjacent substrate, applied directly to a surface of the SLM with one micro-lens per pixel element, applied directly to a surface of the SLM with each micro-lens overlapping more than one pixel element, bonded to the SLM with non-index-matched adhesive, integrated with a field lens, and implemented with negative optical power;

FIG. 7 is a schematic illustration similar to FIG. 6C illustrating more detail of an implementation of the SLM;

FIG. 8 is a schematic illustration similar to FIG. 7 but illustrating an application with a transmissive SLM;

FIG. 9A is a schematic representation showing progression of a rolling update of SLM pixel status followed by a two-dimensional illumination scanning pattern according to an implementation of the present invention;

FIG. 9B is a schematic graph illustrating LCD pixel contrast as a function of time since actuation;

FIG. 9C is a schematic graph illustrating an angular displacement of the illumination scanning mirror in the linear scan direction for the implementation of FIG. 9A;

FIG. 14A is a schematic representation of a desired pixel image output along a row of pixels and a corresponding illumination pattern achievable by the scanning illumination arrangement;

FIG. 14B is a schematic representation of a pixel activation pattern according to an aspect of the present invention for achieving the desired pixel image output, where the SLM is selectively actuated in certain regions and unactuated (or actuated with zero signal) in other regions;

FIG. 14C is an example of the corresponding image output generated by combining the illumination pattern of FIG. 14A with the pixel actuation pattern of FIG. 14B;

FIG. 15A is a schematic illustration of a multiple beam laser scanning array having two beams of each RGB color in side-by-side relation;

FIG. 15B illustrates the overall distributions of optical intensity which can be achieved by changing the balance between the two lasers of a given color;

FIG. 15C illustrates how this effect can be used to provide an improved approximation to linear scanning in the illumination scanning pattern;

FIGS. 17A and 17B illustrate image output intensity variation with distance along a row of pixels that can be achieved by the laser scanner alone and as enhanced by operation of the SLM in a binary mode, respectively;

FIGS. 17C and 17D are views similar to FIGS. 17A and 17B, respectively, showing the effect of broadening the scanned illumination pattern;

FIG. 19A is a schematic graph illustrating spatial variation for different colors scanning across the SLM matrix (while the matrix is set to a different profile for each scan);

FIG. 19B is a schematic illustration similar to FIG. 9A illustrating application of a two-dimensional scan with rolling actuation where the lasers scan simultaneously separate lines with different colors while the pixel values are synchronously updated with the appropriate binary image for the corresponding color;

FIGS. 19C and 19D show an example of laser illumination of a color image similar to that of FIG. 18, shown with and without modulation by the binary SLM pixel matrix, respectively;

FIG. 20A shows the pixel patterns for three successive scans and FIG. 20B shows the overall perceived image intensity.

DESCRIPTION OF THE PREFERRED EMBODIMENTS

Figures 1A, 1B:
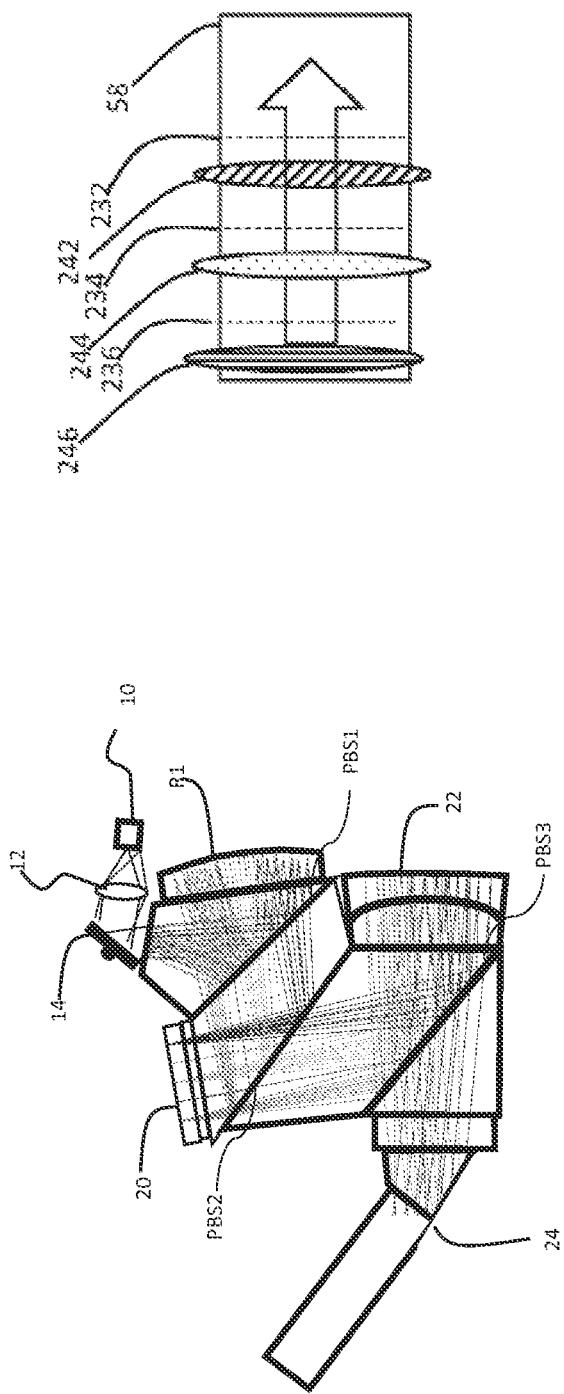
FIGS. 1A and 1B, referred to above, correspond to FIGS. 9A and 12B, respectively, of prior publication WO 2019/111237 A1.

The present invention is an image projector, and components and modes of operation thereof.

The principles and operation of image projectors according to the present invention may be better understood with reference to the drawings and the accompanying description.

By way of introduction, the present invention relates to various aspects of image projectors in which one or more lasers are used to provide scanned illumination of a spatial light modulator (SLM). The subject matter described herein can be subdivided into a number of aspects of the invention, each of which stands alone in its own right, but which are most preferably used to advantage in combination.

A first aspect of the invention relates to enhancement of image uniformity across an exit aperture of an image projector by employing various angular beam spreader elements, typically a diffuser or a micro-lens array (MLA), adjacent to, or in a conjugate plane with, the SLM, and corresponding structural features of image projector devices.

A further aspect of the invention relates to an image projector with a novel approach to employing an SLM and scanning laser illumination in synergy to generate a high-quality projected image and, in some cases, suitable for use with a binary-switchable SLM with only two brightness levels per pixel.

A still further aspect of the present invention relates to various improved techniques for synchronous operation of the SLM and a scanned illumination system. These and other aspects of the present invention will become clearer from the following description.

The various aspects of the present invention are presented in the context of an image projector with projecting optics that collimates the projected image. Such implementations are particularly suitable for an image projector which introduces a collimated image into a light-guide optical element (LOE, alternatively referred to as a waveguide), with two major parallel external surfaces for conveying the image in front of the user by total internal reflection, where it is coupled-out towards the user's eye, as is common in virtual reality and augmented reality display systems. Such systems, which are a preferred embodiment of the present invention, typically employ arrangements of partially-reflective internal surfaces at an oblique angle to the waveguide major surfaces or diffractive optical elements to progressively couple-out the image illumination towards the eye of the user. Such arrangements are well-known in the art, and commercially available from numerous sources, and will therefore not be described here in further detail. It should however be noted that the present invention is not limited to waveguide-based displays, and may be implemented with alternative designs of projecting optics, for example, projecting optics with a finite focal length, for a range of different applications, including but not limited to, non-waveguide-based virtual reality displays, and projectors for projecting an image onto a surface, either for back-projection or front-projection onto a screen.

The various aspects of the present invention are also applicable to devices employing a wide range of different types of spatial light modulator (SLM), including transmission SLMs such as a liquid crystal display (LCD), and reflective SLMs, such as a digital light processing (DLP) chip or a liquid crystal on silicon (LCOS) modulator. In LCD and LCOS implementations in which the modulation is through a change in polarization, the optical arrangements implicitly include the various polarizers and/or other elements required to select the image illumination from the illumination to be rejected from the image. These components are standard features of such image generating arrangements, and are understood to be present even when not explicitly described. The configurations are illustrated herein as single-chip implementations, which may be either monochrome displays or may generate color output images using illumination by three different colors (in sequence or in parallel, as will be discussed below in certain implementations). It should be noted however that color displays based on three-chip architecture may also be implemented using the various aspects of the present invention, as will be clear to a person having ordinary skill in the art.

Turning now to a first aspect of the present invention, the use of a scanned beam of laser illumination to illuminate an SLM provides many advantages (such as those described below), but presents challenges for achieving uniform filling of an exit aperture. Specifically, the scanned laser illumination is typically highly directional, while the properties of the SLM are typically non-dispersive for transmission SLMs and primarily specular reflection for reflective SLMs. As a result, each region of the SLM is typically illuminated by a beam with a relatively narrow range of incident angles, and the modulated beam propagating towards the projecting optics will thus typically also cover a corresponding relatively narrow range of angles, potentially resulting in only partial filling of the exit aperture. If on the other hand the laser illumination were to be spread broadly at source or in the scanning optics, this would undermine the ability to accurately control the illumination pattern on the SLM.

To address this issue, the present invention provides various solutions for implementing an angular beam spreader element, typically a diffuser or a micro-lens array (MLA), adjacent to, or in a conjugate plane with, the SLM, thereby achieving effective filling of the exit aperture while minimizing impact on the precision of scanning of the laser illumination on the SLM.

Figure 2A:
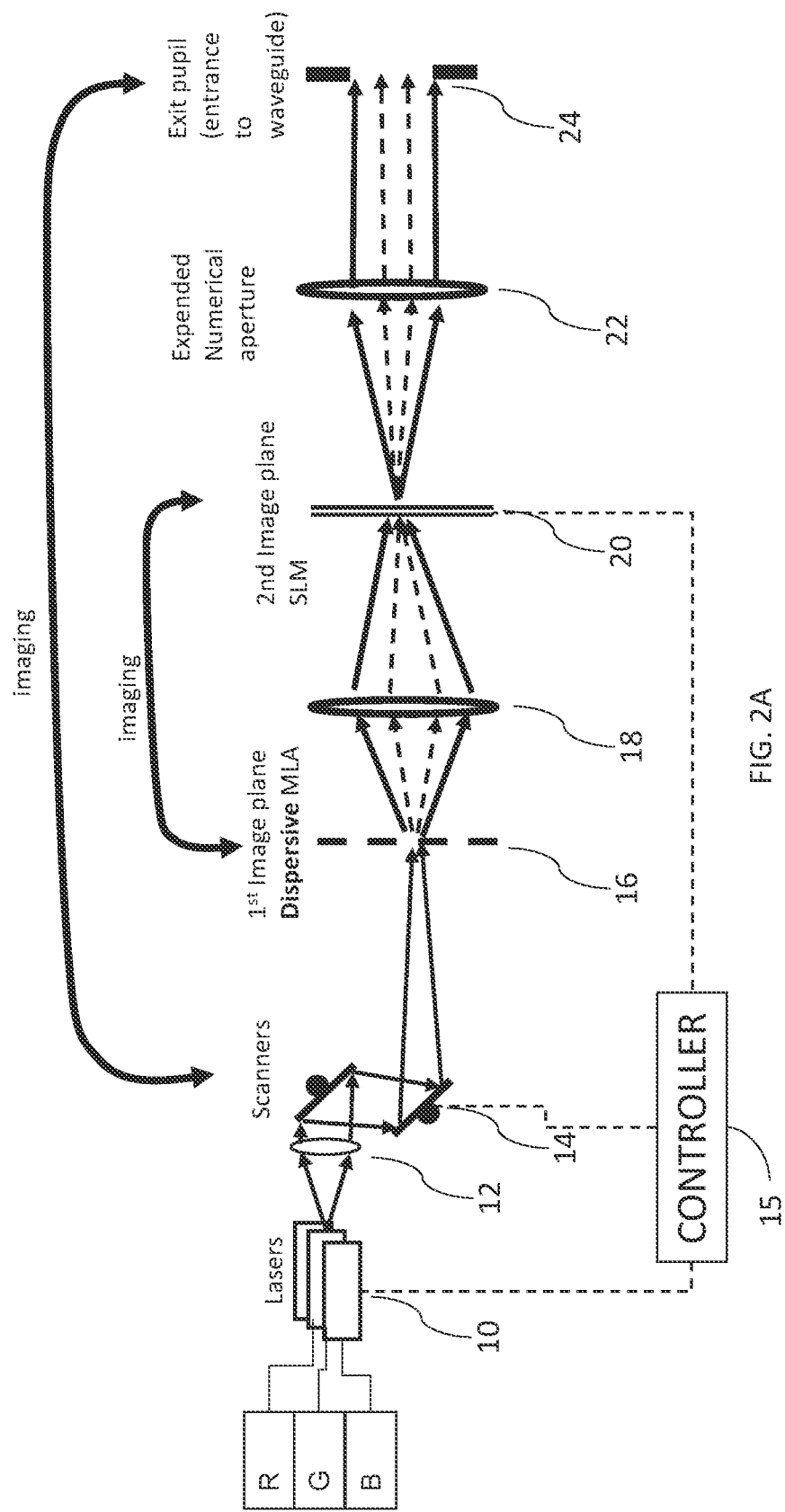
FIG. 2A is a schematic representation of an image projector, constructed and operative according to the teachings of an embodiment of the present invention, employing an angular beam spreader in a conjugate focal plane before a spatial light modulator (SLM)

Turning now to FIG. 2A, this illustrates an image projector, constructed and operative according to an embodiment of the present invention, for projecting an image via an exit stop (exit pupil) 24, the image being a representation of an input digital image. In general terms, the image projector includes a spatial light modulator (SLM) 20 providing a two-dimensional array of pixel elements, each of the pixel elements being controllable to modulate a property of light transmitted or reflected by the pixel element. For simplicity of schematic presentation, SLM 20 is illustrated here in a transmissive SLM geometry, but an optically equivalent system may employ a reflective SLM.

A scanning illumination arrangement deployed to scan a beam of illumination across the two-dimensional array of the spatial light modulator in a two-dimensional scanning pattern while synchronously modulating an intensity of the beam of illumination. Structurally, the scanning illumination arrangement preferably includes one or more lasers 10, most preferably a set of at least three lasers of different colors, and in some preferred cases, an array of six lasers including two lasers for each of three colors, beam shaping optics 12 and a scanning mechanism 14, which typically includes two fast-scanning mirrors driven for rotation about two orthogonal axes, or a single two-axis mirror, all with suitable actuators and driver circuitry, as is known in the art. The major subcomponents of the scanning illumination arrangement are shown here only schematically, while the structural details will be clear to a person having ordinary skill in the art.

A controller 15 is in electronic connection with the SLM 20 and the scanning illumination arrangement (lasers 10 and scanning mechanism 14). Controller 15 typically includes one or more processor, data storage components and input/output components sufficient for performing the various functions described herein for receiving an input digital image (e.g., a sequence of video images) and synchronously actuating the SLM and the scanning illumination arrangement to generate a projected image that is a desired visual representation of the input digital image. Controller 15 may be subdivided into a number of distinct sub-controllers, which may be housed together or may be located separately, and in some cases, at least some of the processing of controller 15 may be performed remotely from the device, such as by preprocessing of video signals supplied to the device via networked communication. All such implementations of controller 15 will be clear to a person ordinarily skilled in the art. Details of the controller components are omitted here for conciseness of presentation of the invention, but will be clear to a person ordinarily skilled in the art from the description of its functionality presented below. Controller 15 is omitted from most of the drawings below for simplicity of presentation, but should be understood to be present in each embodiment.

Projecting optics 22 is also provided, providing at least one optical element configured to project illumination from the spatial light modulator to generate an output image directed to the exit stop 24. The optical element is illustrated here schematically as a single refractive lens, but can equally be implemented employing reflective optical components, additional or compound refractive components, or any combination thereof. In the implementation illustrated schematically here, the projecting optics is collimating optics which outputs a collimated image in which each pixel of the image is conveyed by a collimated beam of light having a corresponding angular direction, suitable for input to a waveguide for an augmented reality display. As mentioned above, other implementations having, for example, a converging projected image that comes to focus at a given distance, also fall within the scope of the present invention.

The system features described up to this point are, for the most part, generic to all embodiments of the invention described below, and should be taken to apply to all embodiments, except where stated otherwise.

In the particularly preferred non-limiting embodiment illustrated here, the image projector further includes an angular beam spreader 16 deployed at an illumination image plane at which the scanned laser illumination is focused. The scanning illumination arrangement thus generates a modulated scanned illumination pattern at this illumination image plane, falling on the angular beam spreader 16. Light from this illumination image plane is refocused by an intermediate optical arrangement 18 with positive optical power deployed in an optical path between the illumination image plane and SLM 20, so that the light falling on the from the illumination image plane is refocused at the SLM 20. The angular beam spreader may be a diffuser, but is most preferably a micro-lens array (MLA).

The functionality of the MLA or diffuser is illustrated by the difference between the dashed arrows and the solid arrows of in FIG. 2A. The dashed arrows describe the laser beam propagation without the MLA, where the illumination at the exit aperture 24 is narrow a relatively narrow beam, causing non-uniform image projection into, and from, the waveguide. The solid arrows illustrate the increased divergence from the MLA, which in turn results in wider and full illumination of exit aperture 24, thereby providing a more uniform image output across the aperture.

The angular beam spreader can be any optical element that disperses the light beams with minimal lateral displacement, such as diffusers or micro-lenses. Preferably the light dispersion is angularly limited to a predefined angular extent so that minimal light is lost outside aperture 24.

In this configuration, in order to optimize image quality, light efficiency and image uniformity across all scanning angles, it is preferable to meet one or both of the following conditions. In some cases, additional optical elements may be introduced to help meet these conditions.

1. The plane in which the MLA or other angular beam spreader 16 is located should be imaged onto the plane of the SLM 20. This ensures that the illumination scanning pattern generated by the scanning illumination arrangement is substantially undistorted by the beam spreading achieved by the MLA.
2. The scanning mechanism 14 is preferably located at a plane which is imaged onto the exit aperture 24, thereby ensuring that source illumination from the scanning arrangement is directed efficiently to reach the exit aperture.

These two conditions are represented schematically in FIG. 2A by corresponding double-ended arrows identifying conjugate focal planes.

In an alternative embodiment, the optical arrangement of FIG. 2A can be modified by swapping the positions of the angular beam spreader 16 and the SLM 20. In this case, the scanning illumination arrangement directly illuminates the SLM 20 with a relatively narrow illumination beam, and the modulated light from the SLM is refocused by intermediate optical arrangement 18 at an image plane, where angular beam spreader 16 is deployed. Projecting optics 22 is deployed to project illumination from the image plane (i.e., that falls on the angular beam spreader 16) to generate the output image directed to the exit stop 24.

Figure 2B:
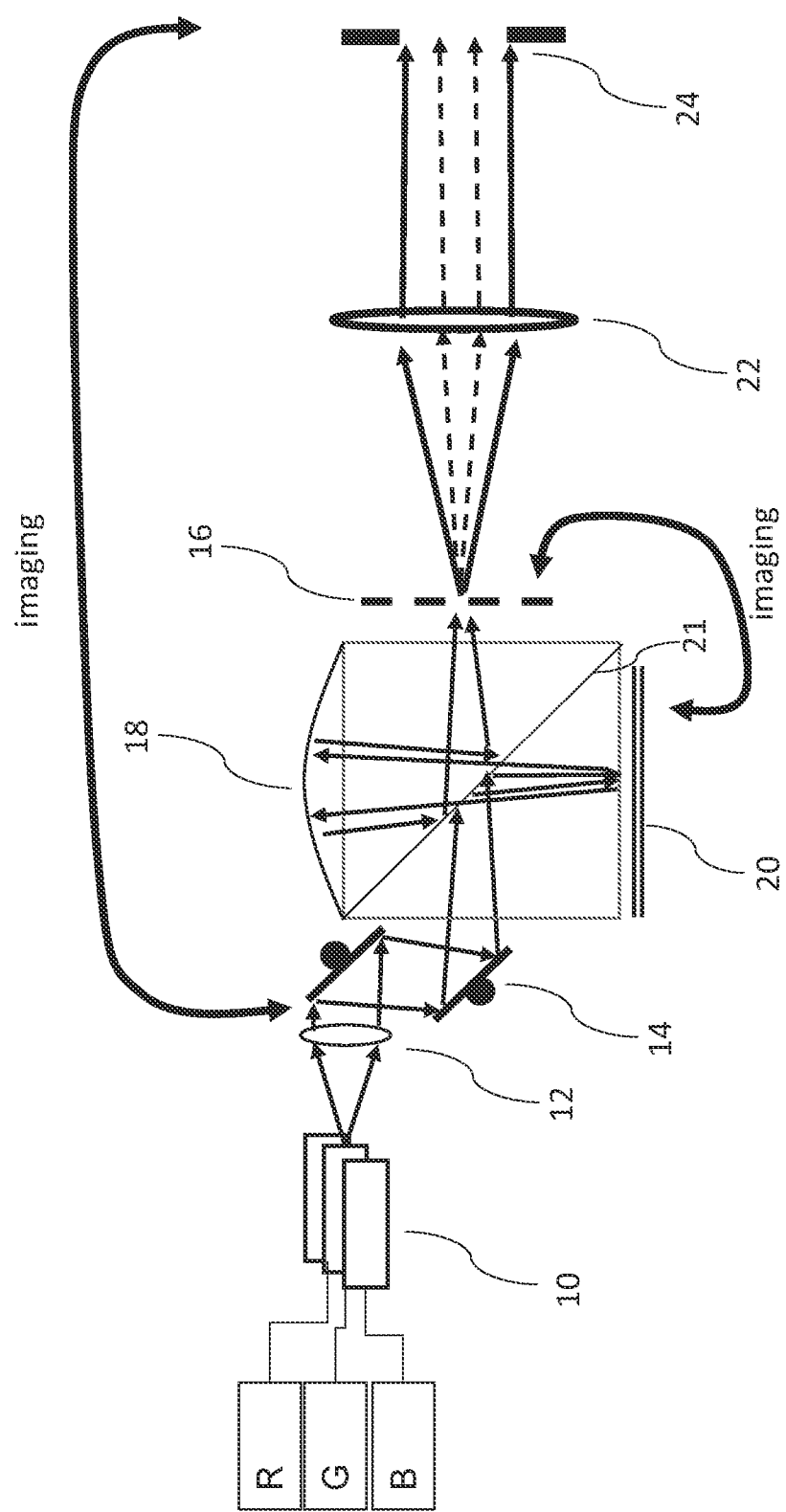
FIG. 2B is a schematic representation of an image projector, constructed and operative according to the teachings of a further embodiment of the present invention, employing an angular beam spreader in a conjugate focal plane after an SLM.

An implementation of this alternative embodiment is shown in FIG. 2B, illustrating also an implementation using a reflective SLM 20, and where reflective optics is used for intermediate optical arrangement 18 while refractive optics is used for projecting optics 22.

The light from lasers 10 is collimated by lens 12 and scanned by fast scanning mirror(s) 14 onto image generator 20. The modulated light reflected from 20 is directed onto focusing reflective lens 18 that refocuses the beam onto MLA 16. The angularly-spread beam for each point in the image is then focused by projecting optics 22 and directed to exit aperture 24. The light paths from the scanning arrangement to the SLM 20 and from reflective lens 18 to MLA 16 employ reflection in a polarizing beam splitter (PBS) 21, while the modulated image illumination from SLM 20 passes through the PBS 21. (Here and throughout this document, it will be understood that, wherever PBS configurations are described, waveplates are provided in order to provide the described sequences of reflection or transmission at the PBS, as is standard practice in the art. These elements are implicit, and will not be described herein.) This configuration provides a particularly compact configuration for the LCOS optics.

The use of reflective intermediate optics followed by refractive optics for the projecting optics is believed to be particularly advantageous, since the two types of optics tend to generate opposite field curvature which thus tend to overlap, giving a better focused image across the field. Optionally, the MLA 16 may advantageously be curved to match the field curvature at the intermediate image plane. The refractive optics, shown here schematically as a single lens, is preferably implemented as a doublet or other multi-element lens system configured to reduce chromatic aberration and/or other aberrations, as is known in the art.

In this embodiment, the image generator, in this case an LCOS 20, is illuminated by a less diverging beam than in the embodiment of FIG. 1A, thereby making its image modulation more efficient. Furthermore, in this configuration the PBS 21 is small and located away from the exit pupil 24 thereby making the system more ergonomic. It should be noted that the hybrid optics, partially reflective and partially refractive, can also be used in an implementation of the optical configuration of FIG. 1A, where a reflective MLA 16 would take the place of LCOS 20, and the LCOS 20 would be placed in the location illustrated for MLA 16, either implemented as a transmission SLM, or employing a further PBS prism (not shown) to allow use of a reflective SLM, prior to the refractive optical arrangement of the projecting optics.

Figure 3:
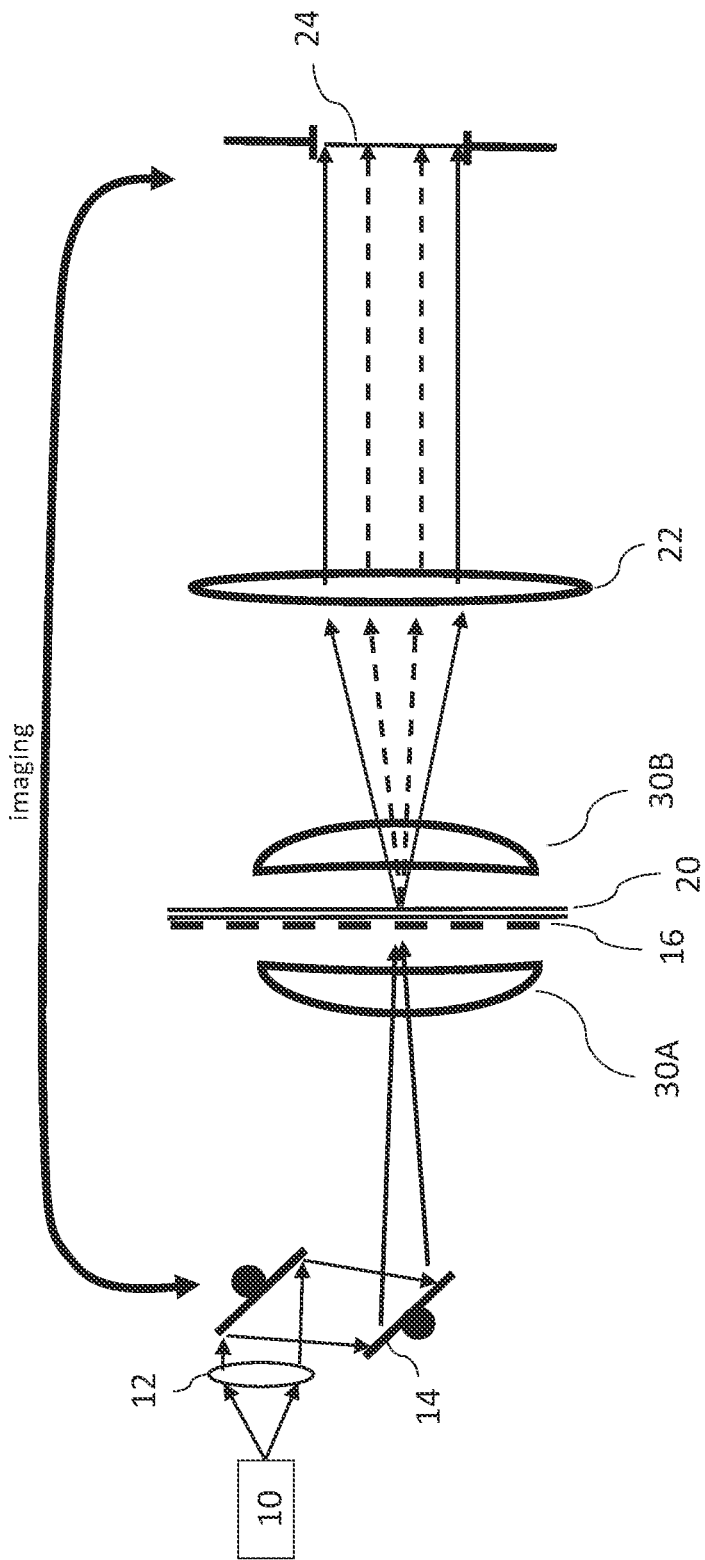
FIG. 3 is a schematic representation of an image projector, constructed and operative according to the teachings of a further embodiment of the present invention, employing an angular beam spreader adjacent to an SLM.

Turning now to FIG. 3, as a more compact alternative to the options of FIGS. 2A and 2B, instead of locating an angular beam spreader in a plane conjugate to the SLM plane, alternative embodiments employ an angular beam spreader that is deployed adjacent to the SLM itself. An example of this concept is illustrated schematically in FIG. 3, and in an exemplary implementation employing reflective optics and a PBS prism in FIGS. 4A and 4B.

Referring to FIG. 3, this illustrates an angular beam spreader, such as an MLA 16, placed adjacent to SLM 20. The MLA 16 can be placed before, after or on both sides of a transmissive SLM 20. In case of a reflective SLM, the adjacent MLA will refract the light twice, before and after reflection. It is apparent that, in this configuration, the optical arrangement is substantially simplified without the need for intermediate optics 18 and the associated alignment and mechanical structure.

As before, it is preferable to achieve imaging of the plane of scanning mirrors 14 onto the exit aperture 24. This can optionally be facilitated with the help of field lenses 30A and/or 30B.

FIG. 4A shows an optical implementation of the configuration in FIG. 3 with a reflective SLM, LCOS 20. The light from laser 10 is reflected and focused by curved reflector 12R (equivalent to lens 12). A lens 34 may optionally be added to improve imaging of the scanner 14 onto the exit aperture 24. The light path is defined by PBS 21 in a highly compact and efficient manner. Doublet lens including 288 and 286 serve the function illustrated by field lenses 30A and 30B of FIG. 3, but with light passing through them twice, before and after the light is reflected by LCOS 20. MLA 16 is located adjacent to LCOS 20 and also acts on the light twice, before and after it is reflected by the LCOS 20.

FIG. 4B shows only the dispersed light-beams from the LCOS reflected at various locations across the LCOS as generated by different positions of the scanning mirror 14. Each location on the LCOS generates a set of divergent beams, spread by MLA 16, which are collimated by projecting optics 22, resulting in a set of parallel beams for each image point, such that the beams for each image point fill the exit aperture 24 and all converge towards this aperture, indicating good imaging of the scanner 14 plane onto the exit aperture 24 plane.

In the particularly-preferred implementation illustrated here, projecting optics 22 is implemented as a doublet reflective lens including a reflective component 291 and one or more refractive component 293 with combined refractive and reflective optical power configured to generate a flat field (focal plane) on the LCOS 20.

As mentioned above, the angular beam spreader in any of the above configurations can be implemented as a diffuser. Where a diffuser is used, it is most preferably a structured diffuser designed to diffuse incident light into a predefined angular distribution to avoid significant wastage of light scattered to higher angles that will not contribute to image projection, and which could generate noise. Optionally, a non-circular distribution may be chosen, such as, for example, rectangular. A range of structured diffusers with different forms of angular distribution are commercially available from various sources such as the ENGINEERED DIFFUSERS™ range of diffusers available from RPC Photonics (NY, USA).

In many cases, micro-lens arrays are believed to provide particular advantages when used in combination with an SLM. FIGS. 5A-8 illustrate various aspects and options relating to the combination of an MLA adjacent to an SLM.

FIG. 5A shows an example of combining a matrix of micro-lenses 264 with an LCOS 260 having active reflective pixel elements 262. The micro-lenses 264 are advantageously located as close as possible to the active pixels. The micro-lenses can be convex or concave. The distance between the micro-lenses 264 and pixels 262 should be substantially different from the focal length of the micro-lenses (preferably, smaller than the focal length), referred to herein as "non-focused proximity" to the pixel elements. This ensures that the reflected beam will have wider divergence than the entering beam. Various ray paths are illustrated as 266 and 268. The divergence of the incident beam 270 is thus smaller than that of the reflected beam 272. In FIG. an incident beam of illumination 274 is shown schematically while the reflected wide beam 276 has wider divergence.

In order to maintain good image resolution, the distance between the micro-lenses 264 and the active pixels 262 should be within the focal depth of the projecting optics 22. FIG. 6A shows the micro-lenses on the outside of a substrate deployed over the pixel matrix (as in FIG. while FIG. 6B shows a preferred alternative in which the micro-lenses are on the surface of the substrate facing towards the pixel elements, therefore being closer to the pixel elements. This configuration also has the advantage of providing a planar outward-facing substrate surface, which facilitates juxtaposition of the assembly with other optical elements, such as a PBS prism.

FIG. 6C shows implementation of the micro-lenses directly on the SLM chip surface, thereby achieving negligible image degradation. In certain cases, the SLM chip may have higher resolution then needed for a given application, in which case the micro-lens array can be implemented with micro-lenses larger than a matrix pixel, as shown in FIG. 6D. Maximum resolution, on the other hand, is preferably achieved by employing an MLA with one lens per pixel element of the SLM, each lens being aligned with a corresponding pixel element.

Implementing the MLA by refractive index change can also achieve beam expansion. GRIN (graded index) lens arrays are available from various suppliers and may be attached as a window to the LCOS substrate. FIG. 6E shows another alternative where substrate 280 having micro-lenses 264 is attached to the surface of LCOS 260 by a glue medium 284 having a refractive index different from that of micro-lenses 264. This example provides structural integrity and simplicity of assembly, fixing the MLA in relation to the SLM and providing a planar outward-facing surface.

FIG. 6F shows a variant of FIG. 6E in which the substrate is part of field lens extending across the SLM. In the example illustrated here, the field lens is a doublet lens having parts 286 and 288, thereby introducing optical power, as illustrated above in FIG. 4A. Most preferably, the outermost part of the lens provides a planar outward-facing surface to simplify assembly in the optical system.

FIG. 6G shows an equivalent dispersing MLA in which each micro-lens has a negative optical power. This configuration is preferably used in a case in which active pixel elements of the SLM have minimal gaps between them, thereby minimizing loss of light.

Conversely, the use of an MLA with positive power for each micro-lens may facilitate modification of the SLM design to reduce cross-talk between pixels. FIG. 7 shows a more detailed diagram of an LCOS SLM structure, where 304 is the silicon base-plane, 306 are the pixel electrodes and 307 and 308 are alignment layers. Layer 308 includes also the upper electrode. The liquid crystal is 309. An outer window is 310 supports the MLA 312 (which can be implemented based on refractive, diffractive, graded index or other element, and according to any of the structures illustrated in FIGS. 6A-6C, 6E or 6F). In this configuration, because of the presence of micro-lenses 312, a smaller area of each pixel element is illuminated. This allows the electrodes 306 to be spaced apart in order to prevent cross field interaction (also referred to as 'fringing field effect'). This electrode spacing is possible because of the implementation of the unfocused MLA 312.

The suppression of the 'fringing field effect' facilitates implementation of a "vertical alignment mode" (VA) SLM structure, that has a superior contrast but would otherwise suffer from high 'fringing field effect'. The large electrode spacing enables high contrast with minimal 'fringing field effect' using the VA configuration.

FIG. 8 shows an equivalent implementation of the same non-focusing MLA on both sides of a transmissive LCD to achieve transmission efficiency. In some implementations, it may be sufficient to implement the MLA on only one side of the transmissive LCD.

Turning now to a further aspect of the present invention, this relates to various improved techniques for synchronous operation of the SLM and a two-dimensional scanning illumination system. The scanning illumination arrangement 14 typically has a fast-scanning axis (also referred as the "resonance axis") that oscillates at, for example, around 10 kHz, and a slower orthogonal axis (also referred to as the "linear-axis"), typically oscillating at a few hundred Hz. The schematic description in FIG. 9A shows an example of plane of SLM 20. By way of example, we consider an image generation matrix of SLM 20 that has 1000×1000 pixels, and is to be operated at a frame rate of 100 Hz, each color frame being made up of three color-separation frames, illuminated sequentially by red, green and blue (RGB) illumination, to form the visual perception of color images updating at 100 Hz. In this example, the matrix (e.g., LCOS) modulation frame-rate should be at 300 Hz. This rate is controlled by the linear mirror oscillating rate, while the resonant mirror generates the lateral scan that is much faster than the linear scan.

Assuming the resonance mirror oscillates at 10 KHz, then the optical spot 120 width (vertical in FIG. 9A) should be:

300$Hz$×1000[lines/frame]/10 KHz=30[lines/optical spot]

The optical scan trace 121 has scans per frame (defining one direction as scan):

1000[lines/frame]/30[lines/spot]=33[lateral scans/frame]

Laser power is modulated to illuminate the required pattern. The speed of the modulation determines the length of the spot size (horizontal in FIG. 9A). In FIG. 9A, it is assumed fast modulation, resulting in a spot 120 with oval shape having a ratio 30:1, where single pixel modulation is achieved in the resonance axis scanning direction.

This 2D laser scanning speed is applicable to the simplest sequence that includes: loading image onto LCOS and only afterwards scanning modulated laser over the LCOS.

More preferably, the image is loaded onto the LCOS in a rolling pattern, where the data to the rows is loaded in sequence, row after row, synchronously with the illumination scanning. FIG. 9A shows a just-loaded row 122 as a dashed line where the progress of rows loading is represented as thick arrow. The row loading advances ahead of the scan progress with spacing 124. This spacing is chosen to accommodate the response time of the liquid crystal molecules to reorient themselves assuming switching the liquid crystal is performed immediately as pixel data is received. FIG. 9B shows the contrast achieved by a liquid crystal pixel as a function of time since actuation. The time needed for the crystal molecule to rotate to its optimal orientation makes it impossible to illuminate immediately after pixel activation. Therefore, the spacing 124 is chosen to correspond to a time difference 125 sufficient for molecule-reorientation. By making a wide gap 124 between the pixel driving 122 (as it progresses downward) and the illumination scanning pattern 121 (as it also advances downward), the liquid crystal molecules have more time 125 to reorient themselves.

Assuming the rolling-load process can be performed only in one direction, the linear scanner will operate in saw-tooth profile shown in FIG. 9C. The linear sections of the scan are used for laser illumination of a frame while, between these sweeps, the scanner performs back-trace without illumination to start illuminating the beginning of the matrix for the next frame.

Figure 10A:
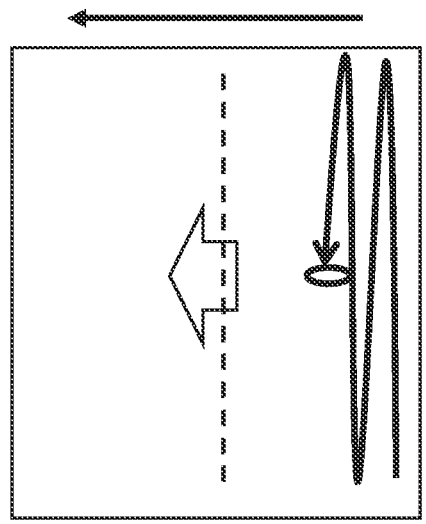
FIGS. 10A and 10B are schematic representations showing two stages of progression of a rolling update of SLM pixel status followed by a two-dimensional illumination scanning pattern according to a bidirectional-scanning implementation of the present invention.
Figure 10B:
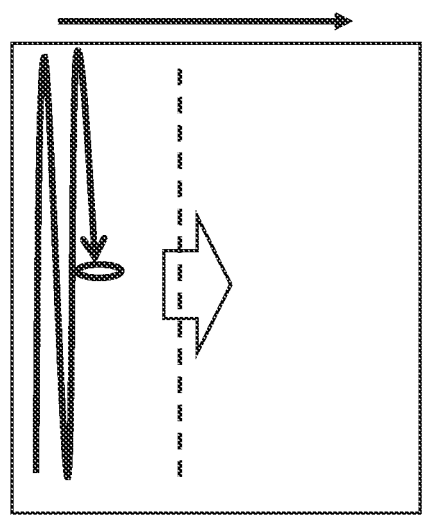
Figure 10C:
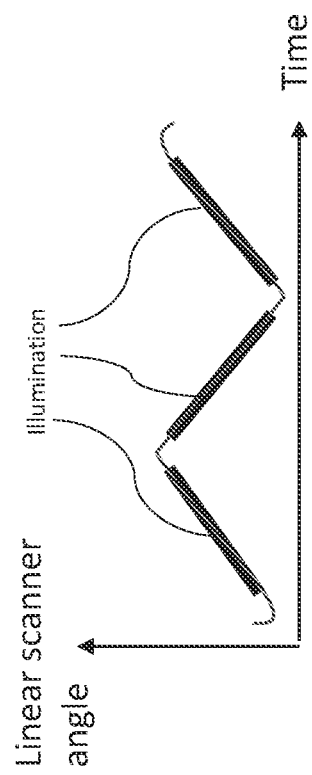
FIG. 10C is a schematic graph illustrating an angular displacement of the illumination scanning mirror in the linear scan direction for the implementation of FIGS. 10A and 10B.

This rolling shutter approach can be implemented with a wide range of SLM image generators with differing data loading patterns. As a further example, FIGS. 10A and 10B show alternatives where the pixel rolling-loading is performed bidirectionally. Consequently, the linear scanning is also performed bidirectionally, first in a downwards sweep (FIG. 10A) and then an upwards sweep (FIG. 10B), with the overall scanning motion as shown in the plot of FIG. 10C, with laser illumination actuated while scanning in both directions. Both direction rolling-loading can be achieved by loading every line in different sequence (for example different circuits from opposite sides of the line) or by activation of every second line by different circuits (interline).

Figure 11B:
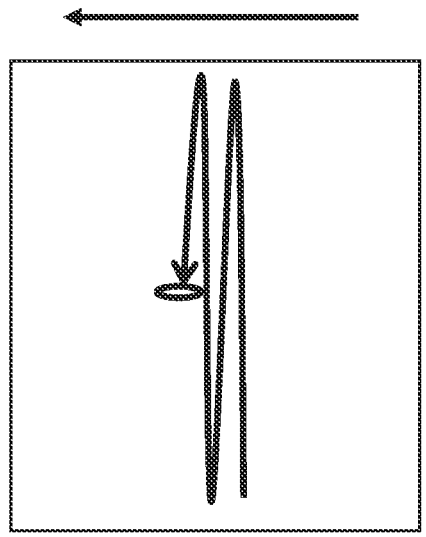
FIGS. 11A-11C are views similar to FIGS. 10A-10C, respectively, for a variant implementation in which a multiple pixel update is performed during illumination scanning in a first direction, and reverse scanning is performed without an update.
Figure 11A:
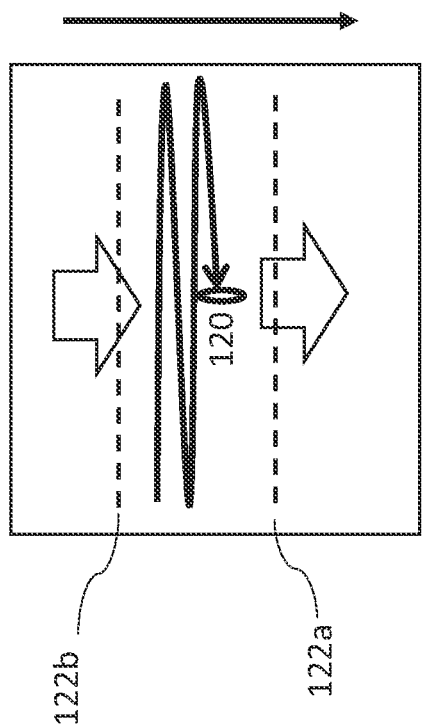
Figure 11C:
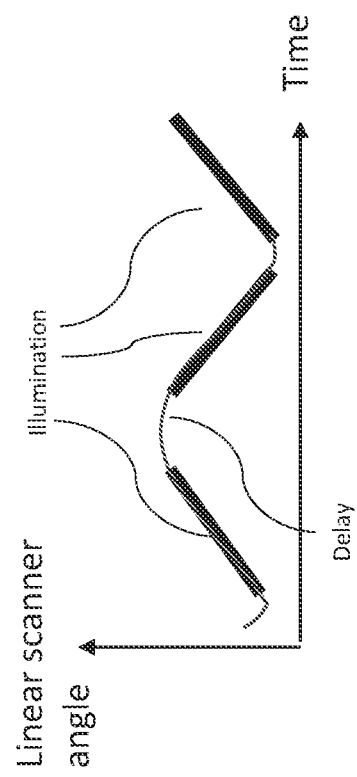

FIGS. 11A-11C illustrate a further variant in which rolling loading 122a of pixel data to the SLM is performed ahead of the illumination scanning pattern 120, as before, and additionally after the illumination scan has passed at 122b. Consequently, as the linear-scan pattern scans back upwards across the SLM (FIG. 11B), the pixel elements are already loaded with the appropriate image. During this back-scan, the time elapsed from actuating the pixels with the image data until the illumination scan reaches those pixels is different for every row. To address this, some delay may need to be introduced between the forward scan and the reverse scan, as illustrated in FIG. 11C, to provide more time for the liquid-crystal molecules to rearrange at proper orientation.

In order to reduce back scan contrast variations, the forward rolling load can be instantaneous, i.e., with actuation of each row as soon as its data is loaded (but maintaining a constant margin 124 before the illumination reaches each row after loading), while for back scan, a global trigger activates all of the matrix simultaneously, independent of the order in which it was loaded. This will generate reduced time variation across the matrix.

FIG. 12 shows an LCOS matrix that is split, where the rolling-load to every half is in opposite directions. The two sections are shown separated by dot-dashed line. In FIG. 12A the scan is performed downward where 122a1 is instantaneous activation of rolling-load downward, i.e., each row being actuated after loading. As a result, these pixels' contrast is uniform having constant time difference 125. The rolling load 122b1 behind the scan can be instantaneous activation or global after scan of the upper section. FIG. 12B shows continuous illumination scan through the lower section that was loaded and activated previously by 122b2 as shown hereon.

Figure 12B:
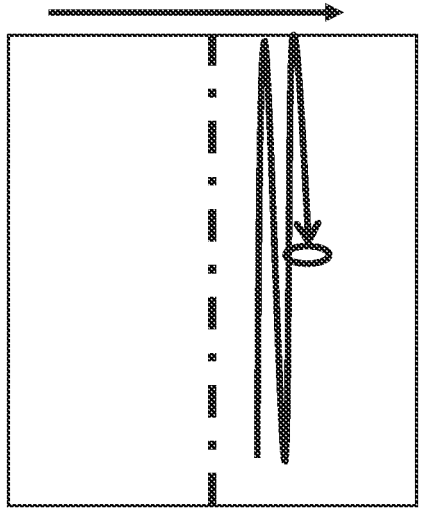
FIGS. 12A-12D are views similar to FIGS. 11A and 11B showing four successive stages of operation for an SLM that is updated in two separate halves.
Figure 12D:
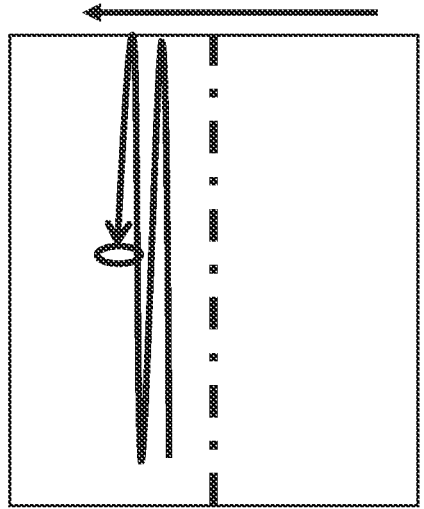
Figure 12A:
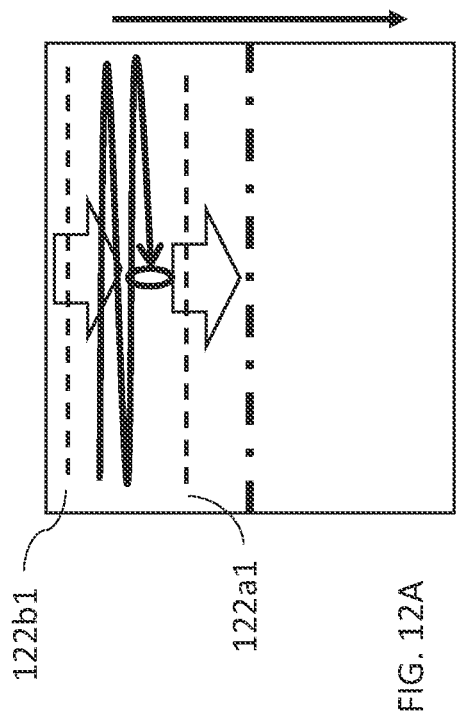
Figure 12C:
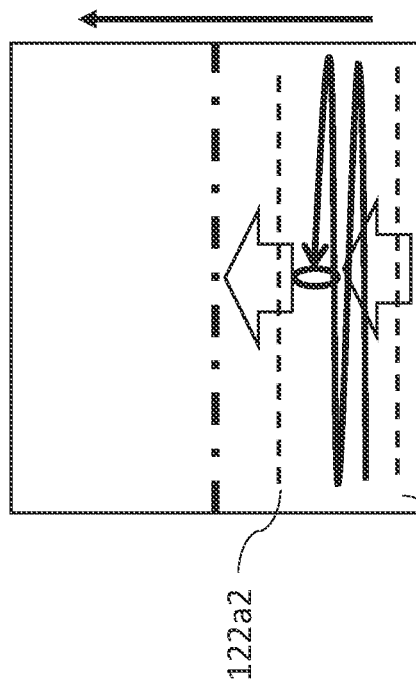

In FIG. 12C, the upward scan is performed with the same rolling load as in FIG. 12A (denoted as 122a2 and 122b2). FIG. 12D shows again optical scan equivalent to FIG. 12B, where the image was already loaded by 122b1 and the time interval was long enough to enable stable and uniform contrast in this section.

The activation of the section behind the laser scan (122b1 and 122b2) can be instantaneous (row-by-row) or triggered global activation.

Turning now to a particularly preferred feature of certain preferred implementations of the present invention, in order not to accumulate electrical capacity (since constant electrical field may adversely affect the properties of the liquid crystal material), the voltage applied to each pixel is preferably reversed between illumination cycles. By combining this inverted actuation with the rolling-shutter actuation scheme, it is possible to achieve faster switching and a faster frame rate than would otherwise be possible.

For such implementations, the display controller 15 (shown in FIG. 2A and implicit throughout the description) is preferably configured to:

(i) actuate the SLM with a rolling update of pixel data to pixel rows advancing along the slow direction of the scanning pattern;

(ii) drive the scanning illumination arrangement to illuminate rows of pixels advancing in the slow direction behind the rolling update of pixel data; and (iii) apply an inverted actuation to the pixel elements of the SLM as a rolling update of pixel rows following behind the beam of illumination.

Figure 13B:
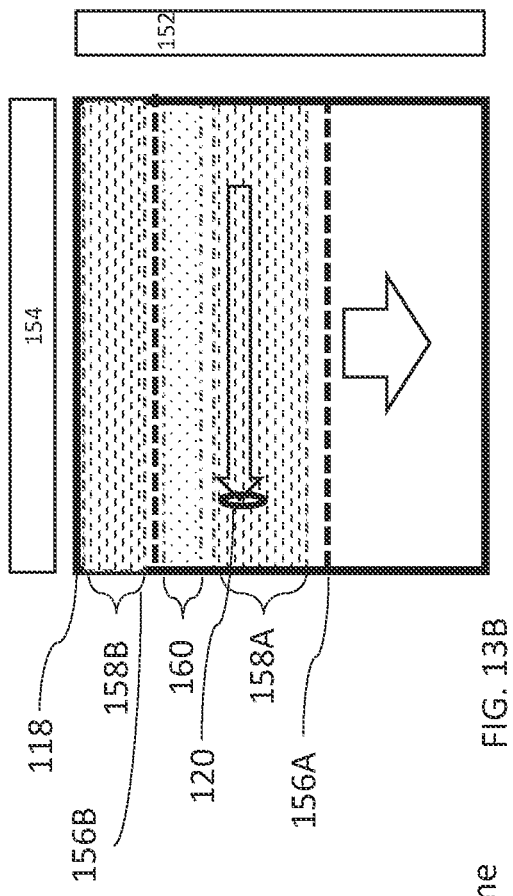
FIG. 13B is a schematic representation of rolling update, scanning illumination and reset of pixel elements across the SLM for achieving the sequence of FIG. 13A.
Figure 13C:
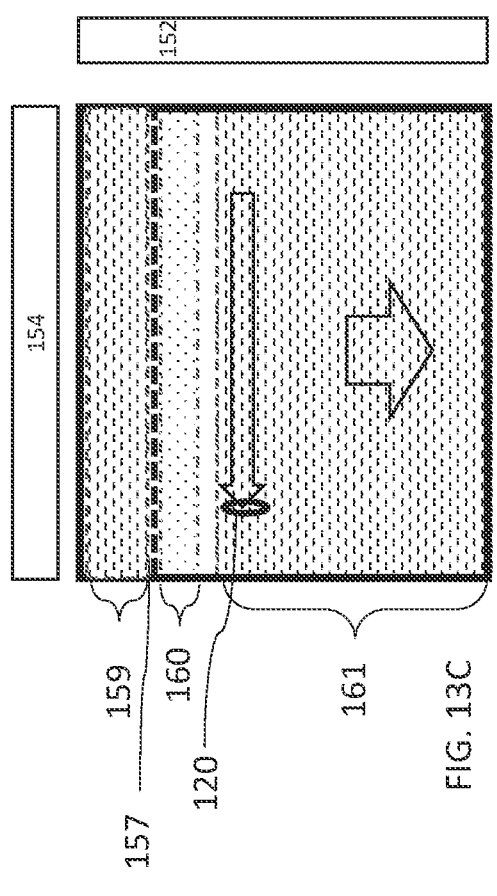
FIG. 13C is a view similar to FIG. 13B illustrating an alternative, simplified implementation.
Figure 13A:
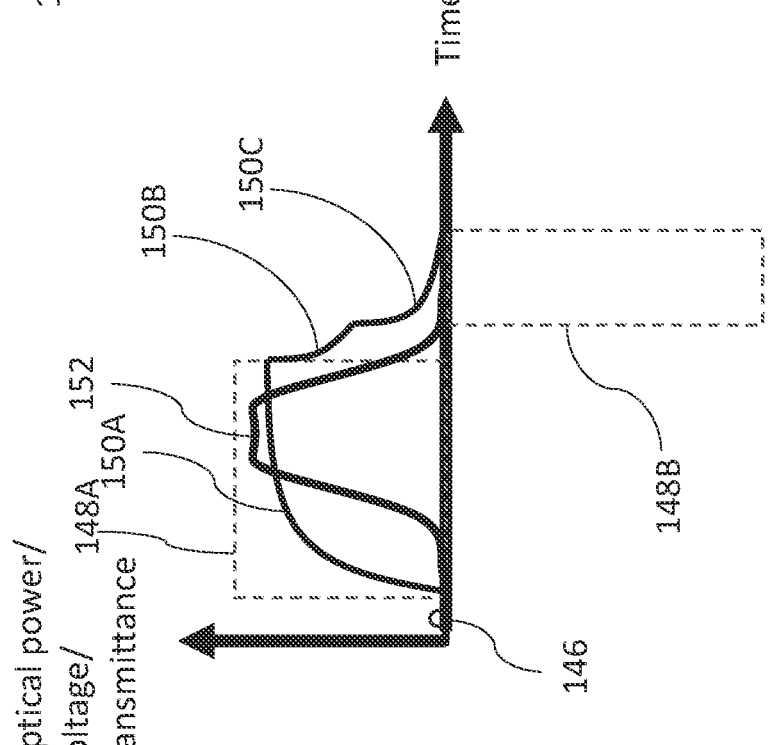
FIG. 13A is a schematic graph illustrating a temporal relation for a given pixel element of data loading, actuation, contrast response of the pixel, illumination and reverse actuation, according to an aspect of the present invention.

FIGS. 13A-13C illustrate schematically a preferred sequence of operation according to this aspect of the present invention. FIG. 13A shows a time sequence across a given pixel. At first (time period 146), the pixel capacitor is charged according to required pixel image. Then the actuation voltage 148A is activated on the pixel causing the liquid crystal to respond according to the contrast response profile 150A (which, according to the SLM design, can be to transmit (make bright) or block (make dark) the state of that pixel by a polarization rotation). During this period, the pixel is illuminated (illumination intensity 152) after which (or during) the voltage on the pixel stops and the LCD starts to decay 150B. Negative voltage is applied at this time 148B (with or without gap between 148A and 148B) and the liquid crystal decays to zero contrast response.

FIG. 13B shows the same process as a spatial progression across the matrix 118 of the LCOS, where sub-controller 152 controls the line activated and voltage applied to this line while sub-controller 154 drives the info (charging the capacitor of the pixels) of the selected row. Here line 156A denotes the row for which data is currently being loaded in the pixel capacitors (denoted time 146 of the pixel cycle in FIG. 13A). Region 158A represents the region currently provided with the forward voltage (pixel cycle period 148A) and region 160 represents the reversed voltage (pixel cycle period 148B) activated after illumination scan 120 has illuminated the specific region. Loading 156B and activation of the next frame 158B can start immediately after 160, giving the liquid crystal more time to respond for the next frame. This configuration is appropriate for actuation schemes including multi-loading per scanned frame (such as in the example of FIG. 11A).

A similar but slower process is described in FIG. 13C. Here 161 represents long activation of LCOS before the scanning illumination 120 passes it, and 157 is the loading after the reverse voltage 160. This configuration is appropriate for single scan per frame (as in FIG.

The fact that illumination over the image plane is controllable, and can be applied selectively, facilitates additional modes of operation LCOS power consumption is reduced by activating fewer pixels. For example, an LCOS operating in Mixed-mode Twisted Nematic (MTN) configuration is normally open (bright) when no voltage is applied to the pixel. Blocking (making dark) the pixel requires power. This typically renders images with a relatively small number of bright pixels and a large proportion of the image dark (as is common, for example, in augmented reality applications) highly energy consuming.

FIG. 14A shows a desired image intensity profile along a row of pixels of an image, corresponding to a single bright pixel 230 in a row of dark pixels in the image plane. Superimposed over the desired intensity profile is the intensity profile of the laser illumination spot (stationary) used to scan across the LCOS at the image plane (profile 232). A conventional approach to generating the desired image intensity profile would be to actuation all pixels in this row to turn them to blocking (dark) pixels, thereby consuming a large amount of energy.

As an alternative approach according to an aspect of the present invention, FIG. 14B illustrates a preferred form of actuation of a row of pixels of the MTN-based LCOS. The pixel at the appropriate location 234 is set to be open, while the pixels in the region required to be dark adjacent to the required pixel and within the footprint of the laser illumination spot profile 236 are set to block the light as much as possible. These activated dark pixels 236 consume system power. The pixels located further from the desired bright pixel in area 238 are not activated, therefore remain "bright" without consuming energy. However, the region of the output image corresponding to pixel region 238 will remain dark since the controller does not actuate the laser illumination while the scanning illumination system is in that region. The dark region therefore remains dark, but at the same time will not consume electrical power since these LCOS pixels are not activated. Optionally, for partial power saving, pixels in region 240 may be only partially blocked, since light power in that region is low, and even partial pixel blocking will bring the output illumination intensity in that region to be below an observable level.

In order to obtain high contrast, the light at the dark sections of the image must be substantially attenuated. Generating high contrast LCOS pixels requires leaving a relatively long response time, which would slow down performance. However, since the illumination is activated selectively, lower contrast of the LCOS is acceptable since the final image contrast (considering dark sections that are not illuminated) is high. Therefore, the liquid crystal orientation in the LCOS can advantageously be set for maximal speed rather than maximal contrast (practice known in the art). This may result in section 236 having some residual transmittance that, after illumination, will give an output illumination intensity profile with residual margins 242 on each side of pixel 230, as illustrated in FIG. 14C.

The above mode of operation for display of a partial image with dark regions is one example of a mode of operation in which the SLM is actuated only partially. The present invention provides a number of other useful modes of operation in which actuation of the SLM is only over one or more subregion of the pixel array, as will be discussed further below.

The scanning pattern of the mirror 14 generated by a slower linear motion superimposed on a faster oscillation typically creates a scanning path which is non-linear, and non-parallel to the pixel rows, across the LCOS (image plane) 218. For various reasons, it may be preferable to at least partially compensate for this non-linearity and/or angular pitch of the scanning trajectory, such as, for example, so that the time gap 125 (image spacing 124) remains more constant across the scanned line, resulting in a more uniform response profile of the liquid crystal (FIG. 9B or 150 in FIG. 13A) along the line. FIGS. 15A-15C illustrate one approach for mitigating this effect linearizing the illuminated scan.

FIG. 15A shows spot pattern of six lasers two red (R1 and R2) two greens (G1 and G2) and two reds (R1 and R2). FIG. 15B shows implementing the green lasers (only green shown for clarity) where the spot is defocused 264 to a larger spot (here shown elongated). Plot 266 shows only lasers G1 profile, 268 shown spot of both G1 and G2 active and 270 shows only G2 active. It is apparent that switching between the lasers (G1 and G2 or more lasers in line if present) shifts the centroid of the illumination pattern. FIG. 15C shows implementation of this property to linearize the scanning pattern. 272 and 274 represent the defocused spots of G1 and G2. Pattern scan 276 represents the non-linear scan pattern generated by the two-axis motion of mirror 14. Line 278 represents the desired linear horizontal illumination line that will be parallel to the rolling load line 256 of the matrix 118. The linearization of the illumination is approximated by switching the illumination between G1 and G2. At the beginning of scan line 276 the lower laser 274 is illuminating (shown as full ellipse) while at the end of the scan the upper laser 272 is activated and linear transition between the lasers generates the approximated corrected line 278. Similar laser activation (but opposite pattern) is activated on the opposite scan 280, if used.

Other scan patterns are possible, and the same activation is advantageously applied to red and blue lasers. In all the above, if the matrix consists of color-filtered pixels, then all lasers can be activated simultaneously without the need for frame per color, since each pixel will act only on the corresponding color.

All the above can be applied to transparent LCDs since the physical properties are same as for LCOS.

A further aspect of the invention relates to an image projector with a novel approach to employing an SLM and scanning laser illumination in synergy to generate a high-quality projected image and, in some cases, suitable for use with a binary-switchable SLM with only two brightness levels per pixel.

Specifically, according to certain particularly preferred implementations of the present invention, controller 15 (shown in FIG. 2A and implicit throughout the description) is configured to:

(i) process the input digital image to generate a first modified image, the first modified image corresponding substantially to a reduced resolution version of the input digital image having a resolution less than the SLM resolution in at least one dimension;

(ii) process the input digital image to generate a second modified image, the second modified image including pixel modulation data for pixel elements of the SLM corresponding to high spatial frequency variations in the input digital image;

(iii) actuate the SLM according to the pixel modulation data of the second modified image; and (iv) drive the scanning illumination arrangement to modulate the intensity of the beam of illumination while scanning across the two-dimensional array so as to illuminate the SLM according to the first modified image, the SLM thereby providing high spatial frequency modulation of the illumination so as to project an output image with pixel intensities corresponding to the digital image.

In other words, the modulated intensity of the scanning illumination arrangement is used to generate a reduced-resolution rendering of the desired digital image, while the higher resolution of the SLM is used to "sharpen-up" the image. This approach is applicable to a broad range of types of SLM, but has particular appeal in the case of a binary-actuation SLM in which each pixel element is switchable between a bright state and a dark state, and in particular, for a ferroelectric liquid crystal display.

Figure 16:
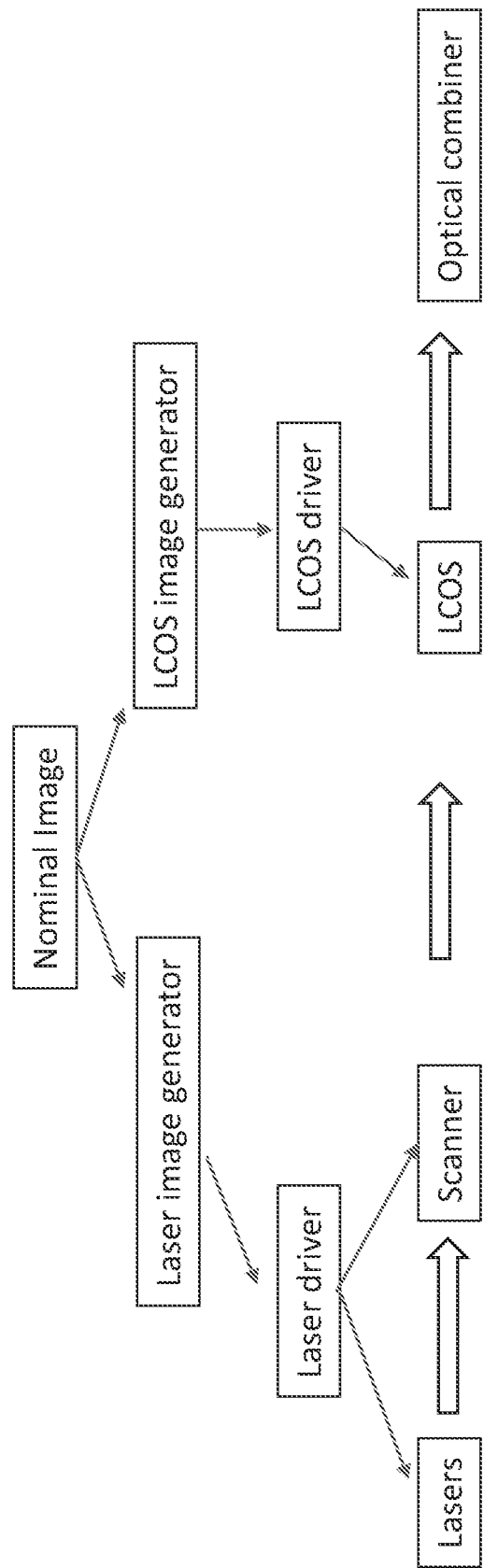
FIG. 16 is a flow diagram illustrating the contributions of two parallel image processing processes to drive the scanned illumination arrangement and the SLM actuation to generate an output image according to a further aspect of the present invention.

A schematic representation of a possible implementation of image processing for a scanning-laser-over-LCOS system is shown in FIG. 16, to be implemented by controller 15. The 'nominal image' (input digital image) is injected into both the image processing of the laser and the LCOS. The images are processed differently according to each of the systems and the two processed images are injected into their appropriate drivers. The light originated by the laser is modulated by the laser driver while the scanning mirror scans across the image field. The light from the scanner illuminates sections of the LCOS that further modulate the image to generate a high-resolution image that is injected into the optical combiner (waveguide) or otherwise projected for viewing by an observer.

Most applications for augmented reality near eye display require high resolution for presenting data such as letters, numbers or markings. This type of data is mostly presented to the viewer as a binary image where pixels are on or off with minimal gray level modulation.

According to one embodiment of this invention, substantial simplification is achieved by setting the LCOS to activate the pixels in a binary mode where they are either 'open' or 'closed'. For example, ferroelectric liquid crystal can be used for such application. The 'closed' position can be partial close according to contrast requirements of the system. Hereon, for simplicity, 'closed' will be taken to refer to a pixel exhibiting no transparency.

FIG. 17A shows an example where a laser illumination spot is larger than the pixel size (as previously described) and therefore is rounded (solid line) and cannot generate the sharp edge (dashed line) that also represent the edge of a pixel. By implementing a binary LCOS this illumination approximates the desired as shown in FIG. 17B. Here, the location where the nominal image has no intensity, the pixel of the LCOS is turned off. FIG. 17C shows an example of larger laser spot size and FIG. 17D shows that in this the LCOS generates a sharper intensity profile.

Figure 18:
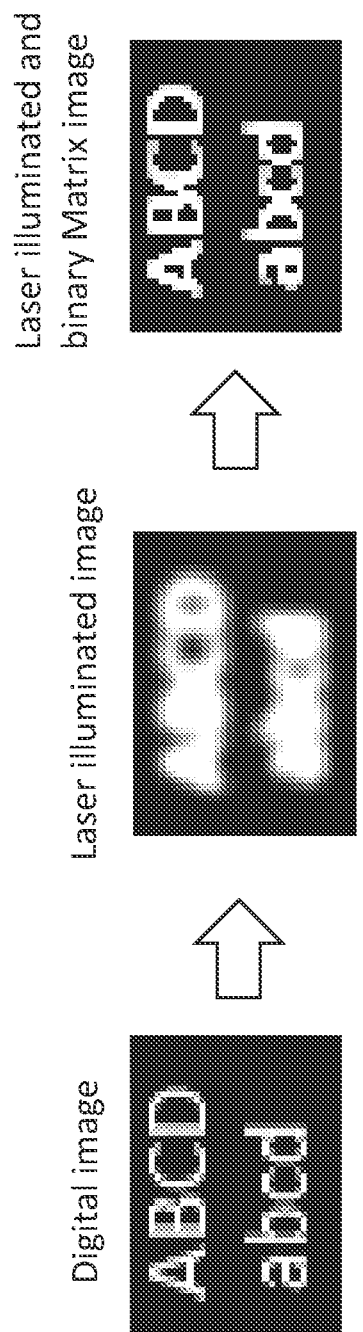
FIG. 18 illustrates this process, showing the input digital image, the corresponding laser illuminated image, and the output when the laser illuminated image is modulated by the SLM.

An example of this mode of operation is shown in FIG. 18. The 'digital image' is the image injected into the system. It is comprised mostly of black pixels, some gray and some white. The width of the letters is one or two pixels. The 'laser illumination image' is generated by a Gaussian profile laser beam having width of three pixels. The letters cannot be separated and are not legible. After activating the binary LCOS, the letters are recognizable and separatable. Gray scale is almost not observable.

The same binary modulation can be implemented in sequential laser scanning illumination for colors. The profile in FIG. 19A represent different color illumination profiles along rows of the matrix that are applied in sequence after the matrix is set appropriately according to the corresponding color separation frame for every scan.

FIG. 19B illustrates that this approach can be implemented for a two-dimensional scanning illumination pattern with synchronous update of each color, conceptually similar to FIG. 9A. In this case, and most preferably using a multi-laser source with spaced-apart RGB lasers which can be operated simultaneously and independently, it is possible to perform a parallel simultaneous raster scan across the SLM with rolling reset of the pixels and rolling update of the pixel values to the required binary pixel values for the next color as the three scans advance simultaneously across the SLM. By scanning with all three colors simultaneously, it is possible to slow down the linear scan speed and thereby increase the effective resolution of the laser illumination system for a given overall frame rate.

FIG. 19C shows an example of laser illumination having the same parameters as in FIG. 18, while FIG. 19D shows the image after this illumination is modulated by the binary matrix.

Figure 20C:
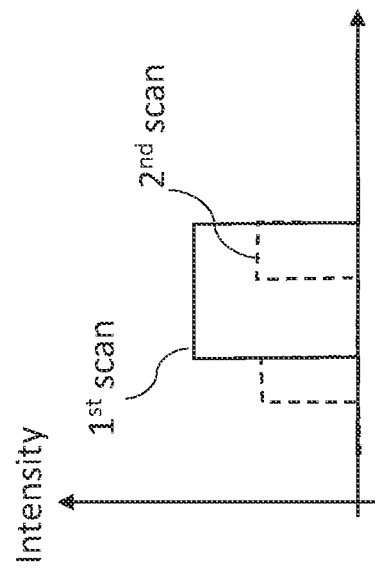
FIGS. 20C and 20D are views similar to FIGS. 20A and 20B, respectively, where a combination of different pixel actuation patterns and different illumination intensities are used to achieve a result similar to FIG. 20B in only two successive scans.
Figure 20D:
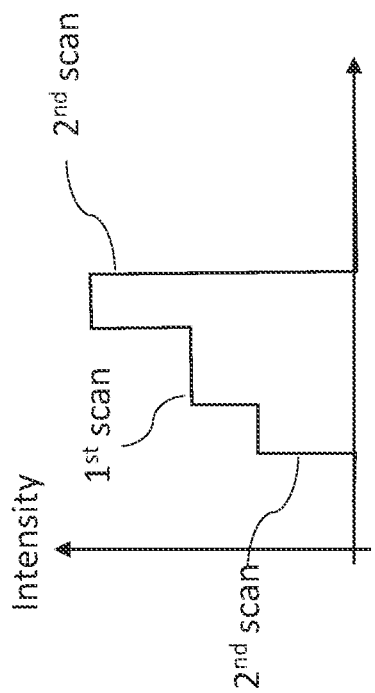
Figure 20A:
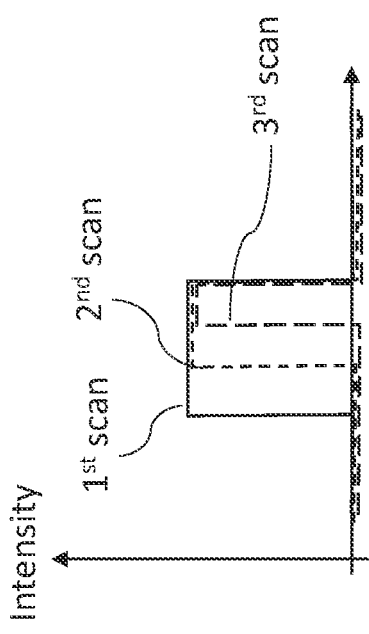
FIGS. 20A and 20B illustrate the use of successive scans with different SLM pixel actuation patterns to achieve pixel-resolution apparent gray-scale image variations using a binary-switchable pixel array, where
Figure 20B:
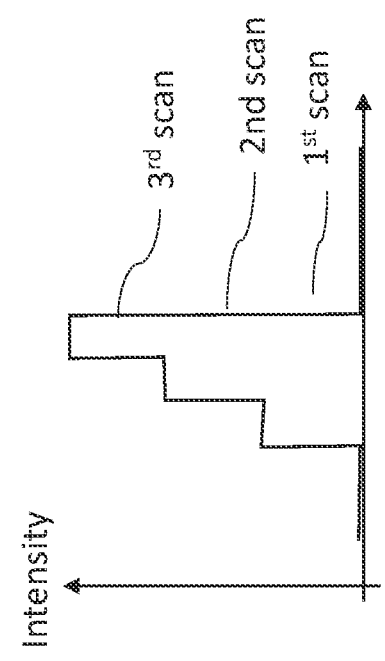

For further gray-scale resolution, sequential scans of same color can be implemented as shown in FIGS. 20A-20D. In FIG. 20A, three separate sequential illuminations having same power are binary-modulated to be perceived by the observer as intensity profile of FIG. 20B. FIG. 20C shows different power sequential illumination to generate same profile but by two scans only.

It should be noted that various modes of operation do not require the entirety of the SLM to be actuated at all times. Selective and partial actuation of the SLM may provide advantages of energy savings (and consequent extended battery life for battery-operated applications), reduce the image processing burden and/or may facilitate faster frame rates.

Thus, according to certain particularly preferred implementations of the present invention, controller 15 (shown in FIG. 2A and implicit throughout the description) is configured to:
  (i) apply at least one criterion to determine a sub-region of the SLM required to generate output in a corresponding sub-field of the output image, the controller being configured to actuate the sub-region of the SLM while leaving a plurality of pixel elements outside the sub-region unactuated; and
  (ii) drive the scanning illumination arrangement to illuminate at least the sub-region of the SLM so as to project an output image with pixel intensities corresponding to the digital image in at least the corresponding sub-field, the pixel intensities being determined by a state of modulation of the pixel elements and an intensity of illumination from the scanning illumination arrangement falling on the pixel elements.

One example of such an application is when an image is to be displayed selectively in only a subregion of the image plane, as described above with reference to FIGS. 14A-14C. In that case, the "criterion" is that the required image only has non-zero (or visible) values within the sub-regions, and the scanned illumination arrangement is actuated so as not to deliver illumination outside the required subregion.

Other applications do deliver illumination outside the actuated region. This is particularly relevant where the pixel elements assume a bright state when not actuated. In this case, controller is configured to drive the scanning illumination arrangement to modulate the intensity of the beam of illumination while scanning both inside and outside the sub-region of the SLM. The result is that the sub-region of the image within which the SLM is actuated has the benefit of the enhanced resolution, clean edges or other high spatial-frequency features that are provided by the SLM modulation, while the remaining regions of the image are limited by the inherent resolution of the scanning illumination system for forming an image. The result may thus be considered a "mixed resolution" image.

To continue the above example of an application in which the SLM has 1000×1000 pixels and the scanned illumination arrangement operates at a resonant scanning frequency of 10 kHz, if the frame rate is reduced to 33 Hz, coverage of each color separation frame can be achieved using a laser spot which covers 10 rows of the pixel matrix. If the modulation frequency is correspondingly adjusted, the native resolution of the laser scanning projection will become equivalent to a region of 10×10 pixels of the SLM array. Thus, regions where the SLM is not actuated will be projected at the laser scanner resolution, while the sub-region(s) within which the SLM is actuated are enhanced by the SLM modulation, as described above.

A number of different criteria may be used as a basis for determining within which sub-region(s) of the image the SLM should be actuated. In a first example, the at least one criterion includes determining a region of the input digital image containing high spatial frequency content. For example, if the image contains a sub-region with textual content and other regions with more gradually-varying features, the native resolution of the scanning laser projector may be sufficient for the non-textual content while the SLM may be selectively actuated in the region containing text to render the textual content legible.

In a further example, the at least one criterion may include determining a sub-field of the output image corresponding to a current gaze direction of an eye of a viewer (as determined by an eye-tracking system—not shown). This approach relies on the fact that the peripheral vision of the human eye has much lower resolution than the central (foveal) region, such that the eye is insensitive to a reduction is image resolution outside the current gaze direction. The system can therefore selectively actuate the SLM within a region around the current gaze direction to provide a "full resolution" projected image, while displaying the peripheral field at the native scanning laser projector resolution.

It will be appreciated that the above descriptions are intended only to serve as examples, and that many other embodiments are possible within the scope of the present invention as defined in the appended claims.

What is claimed is:

1. An image projector for projecting an image via an exit stop, said image being a representation of an input digital image, the image projector comprising:
(a) a spatial light modulator (SLM) providing a two-dimensional array of pixel elements defining an SLM resolution, each of said pixel elements being controllable to modulate a property of light transmitted or reflected by said pixel element;
(b) a scanning illumination arrangement deployed to scan a beam of illumination across said two-dimensional array of said spatial light modulator in a two-dimensional scanning pattern while synchronously modulating an intensity of said beam of illumination;
(c) a controller in electronic connection with said spatial light modulator and said scanning illumination arrangement; and
(d) projecting optics comprising at least one optical element configured to project illumination from said spatial light modulator to generate an output image directed to said exit stop, wherein said controller is configured to:
(i) process said input digital image to generate a first modified image, the first modified image corresponding substantially to a reduced resolution version of the input digital image having a resolution less than the SLM resolution in at least one dimension;
(ii) process said input digital image to generate a second modified image, the second modified image including pixel modulation data for pixel elements of said SLM corresponding to high spatial frequency variations in the input digital image;
(iii) actuate said SLM according to the pixel modulation data of said second modified image; and
(iv) drive said scanning illumination arrangement to modulate the intensity of the beam of illumination while scanning across said two-dimensional array so as to illuminate said SLM according to said first modified image, said SLM thereby providing high spatial frequency modulation of said illumination so as to project an output image with pixel intensities corresponding to the digital image.

2. The image projector of claim 1, wherein said two-dimensional scanning pattern has a fast direction aligned with rows of said SLM and a slow direction aligned with columns of said SLM, and wherein said SLM is actuated as a rolling update of pixel rows advancing along the slow direction ahead of the beam of illumination.

3. The image projector of claim 2, wherein said controller is further configured to apply an inverted actuation to the pixel elements of said SLM as a rolling update of pixel rows following behind the beam of illumination.

4. The image projector of claim 1, wherein said SLM is a ferroelectric liquid crystal display in which each pixel element is switchable between a bright state and a dark state.

5. The image projector of claim 1, wherein said controller is configured to apply at least one criterion to determine a sub-region of said SLM required to generate high resolution output in a corresponding sub-field of the output image, said controller being configured to actuate said sub-region of said SLM while leaving a plurality of pixel elements outside said sub-region unactuated.

6. The image projector of claim 5, wherein said pixel elements assume a bright state when not actuated, and wherein said controller is configured to drive said scanning illumination arrangement to modulate the intensity of the beam of illumination while scanning both inside and outside said sub-region of said SLM.

7. The image projector of claim 6, wherein said at least one criterion includes determining a region of the input digital image containing high spatial frequency content.

8. The image projector of claim 6, wherein said at least one criterion includes determining a sub-field of the output image corresponding to a current gaze direction of an eye of a viewer.

9. The image projector of claim 5, wherein said controller is configured to drive said scanning illumination arrangement to illuminate only said sub-region of said SLM.

10. The image projector of claim 1, further comprising an angular beam spreader deployed adjacent to said SLM.

11. The image projector of claim 1, further comprising a micro-lens array (MLA) deployed in non-focused proximity to said SLM.

12. The image projector of claim 11, wherein said MLA includes one lens per pixel element of said SLM, each lens being aligned with a corresponding pixel element.

13. The image projector of claim 11, wherein said MLA is attached to a surface of said SLM.

14. The image projector of claim 11, wherein said MLA is integrated with a transparent substrate overlying said SLM.

15. The image projector of claim 14, wherein said MLA is in facing relation to said SLM and wherein said substrate provides a planar surface facing away from said MLA.

16. The image projector of claim 15, wherein said MLA is formed from a material having a first refractive index, and wherein a transparent adhesive fills a space between said MLA and said SLM, said transparent adhesive having a second refractive index different from said first refractive index.

17. The image projector of claim 15, wherein said substrate is part of field lens extending across said SLM.

18. The image projector of claim 17, wherein said field lens is implemented as a doublet lens that presents a planar surface facing away from said SLM.

19. The image projector of claim 1, further comprising:
   (a) an intermediate optical arrangement with positive optical power deployed in an optical path between said SLM and said collimating arrangement, said intermediate optical arrangement refocusing illumination from said SLM at an image plane; and
   (b) an angular beam spreader deployed at said image plane, wherein said projecting optics is deployed to project illumination from said image plane to generate the output image directed to said exit stop.

20. The image projector of claim 19, wherein said angular beam spreader is a micro-lens array.

21. The image projector of claim 1, further comprising:
   (a) an angular beam spreader deployed at an illumination image plane, said scanning illumination arrangement being configured to generate a modulated scanned illumination pattern at said illumination image plane; and
   (b) an intermediate optical arrangement with positive optical power deployed in an optical path between said illumination image plane and said SLM, said intermediate optical arrangement refocusing illumination from said illumination image plane at said SLM.

* * * * *